(12) United States Patent
Miyasaka et al.

(10) Patent No.: US 7,270,161 B2
(45) Date of Patent: Sep. 18, 2007

(54) PNEUMATIC TIRE FOR MOTORCYCLE

(75) Inventors: Atsushi Miyasaka, Kodaira (JP); Hajime Nakamura, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 424 days.

(21) Appl. No.: 10/501,324

(22) PCT Filed: Jan. 17, 2003

(86) PCT No.: PCT/JP03/00336

§ 371 (c)(1), (2), (4) Date: Jul. 15, 2004

(87) PCT Pub. No.: WO03/061994

PCT Pub. Date: Jul. 31, 2003

(65) Prior Publication Data

US 2005/0115653 A1    Jun. 2, 2005

(30) Foreign Application Priority Data

Jan. 18, 2002   (JP) ............................. 2002-010896

(51) Int. Cl.
*B60C 11/03* (2006.01)
*B60C 11/13* (2006.01)

(52) U.S. Cl. .......................... 152/209.11; 152/209.24; 152/209.28

(58) Field of Classification Search ........... 152/209.11, 152/209.28, 209.24; D12/535, 537, 538, D12/552, 559, 562, 564
See application file for complete search history.

(56) References Cited

U.S. PATENT DOCUMENTS

| | | | |
|---|---|---|---|
| 4,289,182 A | | 9/1981 | Sato et al. |
| D288,196 S | * | 2/1987 | Ikeda ........................ D12/534 |
| 4,832,099 A | * | 5/1989 | Matsumoto ............ 152/209.28 |
| 5,234,042 A | * | 8/1993 | Kuhr et al. ............ 152/209.28 |
| D381,298 S | * | 7/1997 | Haas ........................ D12/534 |
| 6,220,320 B1 | * | 4/2001 | Nakagawa et al. .... 152/209.11 |
| D449,023 S | * | 10/2001 | Toyozawa ................. D12/537 |

(Continued)

FOREIGN PATENT DOCUMENTS

EP   368553   *   5/1990

(Continued)

*Primary Examiner*—Steven D. Maki
(74) *Attorney, Agent, or Firm*—Sughrue Mion, PLLC

(57) ABSTRACT

To provide a pneumatic tire for a motorcycle in which both wear resistance and wet steering stability can be attained. Since a pair of zigzag circumferential direction grooves 28 are positioned at the center of a tread central region 24C and has an amplitude, even when a certain camber angle is exceeded, an occurrence of a sudden separation of the zigzag circumferential direction groove 28 from a road-contact surface 26 can be prevented, whereby deterioration of wet steering stability can be suppressed. When the camber angle increases, water in a road-contact surface 26 is drained by inclining grooves 32 which are arranged at an external side of the zigzag circumferential direction groove 28. Since sharp inclining groove portions 32A of the inclining grooves 32 are positioned in the tread central region 24C, and no lug groove components are employed, circumferential direction rigidities of land portions in the tread central region 24C are high and exhibits excellent wear resistance. Since loose inclining groove portions 32B and sub-inclining grooves 38 of the inclining grooves 32 are positioned in tread side regions 24S, rigidities of land portions 40 resisting to inputs at the time of a large camber angle are high, and accordingly, wear resistance is high.

23 Claims, 9 Drawing Sheets

U.S. PATENT DOCUMENTS

| | | | |
|---|---|---|---|
| 6,382,282 B1 * | 5/2002 | Vormfenne | 152/209.28 |
| 2005/0098250 A1 * | 5/2005 | Ito | 152/209.11 |

FOREIGN PATENT DOCUMENTS

| | | | |
|---|---|---|---|
| JP | 55-91407 | * | 7/1980 |
| JP | 6-55909 | * | 3/1994 |
| JP | 6-143931 | * | 5/1994 |
| JP | 10-244811 | * | 9/1998 |
| JP | 11-291715 | * | 10/1999 |
| JP | 2000-43509 | * | 2/2000 |

* cited by examiner

PNEUMATIC TIRE FOR MOTORCYCLE

BACKGROUND OF THE INVENTION

1. Field of the Invention

The present invention relates to a pneumatic tire for a motorcycle, and more particularly, to a pneumatic tire for a motorcycle in which both wear resistance and wet steering stability can be obtained.

2. Background Art

In order to obtain drainage performance during a motorcycle travel on a wet road surface, grooves are formed on a tread of a pneumatic tire for a motorcycle.

For example, tread patterns shown in FIGS. 5 to 7 can respectively be employed as a tread pattern for a conventional pneumatic tire for a motorcycle.

A tire 100 has tread pattern, shown in FIG. 5, which is a combination of small bock patterns from a viewpoint of drainage performance and a rubber with high elasticity. However, the tire 100 cannot provide effective block rigidity, and has not been suitable for a machine that outputs a large power in respect of wear resistance. In other words, when the tire 100 is used for a large power-outputting machine, edge portions of blocks 102 to 114 at a stamping side and at a kick-out side easily unevenly wear, thus deteriorating steering stability.

A tire 200 having a tread pattern shown in FIG. 6 and a tire 300 having a tread pattern shown in FIG. 7 are respectively designed based on an idea that a grip should be obtained on surfaces of blocks (land portions), as compared with a conventional idea that a grip should be obtained at edges thereof. Since lug grooves substantially extending in a tire transverse direction are not formed in the vicinity of each of the centers of the tires 200 and 300, the respective tires 200 and 300 provide high circumferential direction rigidity and exhibit excellent traction performance and wear resistance. However, from a viewpoint of a ratio of a block pattern to a tire, it can be considered that drainage performance is poor due to a low negative rate, and grip sensation is not granted due to insufficient edge components.

In the tire 200 shown in FIG. 6, circumferential direction linear grooves 204 which extend linearly in a tire circumferential direction are respectively provided at both sides of the tire equatorial plane CL of a tread 202 to define a rib 205 which extends linearly along a tire circumferential direction.

A plurality of inclining grooves 206, which are inclined such that end portions of the inclining grooves 206 at the tire equatorial plane CL side are located closer to a tire rotational direction side than to a tread end side, is formed in a tire circumferential direction at both sides of a pair of the circumferential direction linear grooves 204, and an inclining sub-groove 208 is formed between the inclining groove 206 in the vicinity of the tread end.

The inclining groove 206 at the tire equatorial plane CL with respect to a tire circumferential direction is almost fixed at an angle of 28 degrees, and an angle in the vicinity of the tread end with respect to a tire circumferential direction gradually increases toward the tread end.

The inclining grooves 206 are arranged at a substantially equal pitch in a tire circumferential direction, and terminate in the vicinities of the respective circumferential direction linear grooves 204. As shown by a chain double-dashed line, substantially trapezoidal land portions 210, each of which width at a tire rotational direction side (side in a direction of arrow A) is comparatively narrow, and each of which width in a direction opposite to a tire rotational direction is comparatively large, are continuously formed in a tire circumferential direction.

Arrows marked on the tread 202 of FIG. 6 indicate input directions in which inputs are exerted onto the tread 202 of the tire 200 during a motorcycle travel. During a motorcycle straight drive, portions near the tire equatorial plane CL mainly road-contact, and input directions are directed toward a tire circumferential direction. However, during a motorcycle cornering, input directions are likely to incline with respect to a tire circumferential direction, and the larger the camber angle, the closer the input directions to a tire transverse direction.

By the way, each of the land portions 210 of the tire 200 shown in FIG. 6 has a large difference between rigidity at a tire rotational direction side and rigidity at a side opposite to the tire rotational direction side. Accordingly, a problem is caused in that uneven wear may easily occur due to an input exerted in a tire circumferential direction thereby deteriorating steering stability.

Further, in the tire 300 shown in FIG. 7, three circumferential direction linear grooves 304, which extend linearly in a tire circumferential direction, are provided respectively at both sides of the tire equatorial plane CL of a tread 302. Five ribs 305, which extend linearly in a tire circumferential direction within a comparatively wide range of a tire transverse direction, are formed in the vicinity of the tire center.

Moreover, a plurality of inclining grooves 306, which are inclined such that an end portion of each of the inclining grooves 306 at the tire equatorial plane CL side is positioned closer to a tire rotational direction side than to a tread end, is formed in a tire circumferential direction at both external sides in a tire transverse direction of the circumferential direction linear grooves 304.

The inclining grooves 306 of the tire 300 are inclined at a fixed angle with respect to a tire transverse direction, and arranged at a substantially pitch in a tire circumferential direction.

Accordingly, a plurality of parallelogram shaped land portions 308 is formed in a tire circumferential direction at both external sides in a tire transverse direction of the circumferential direction linear grooves 304.

Arrows marked on the tread 302 of FIG. 7 indicate input directions in which inputs are exerted onto the tread 302 of the tire 300 during a motorcycle travel.

By the way, in the tire 300 shown in FIG. 7, since the ribs 305 which extend linearly along a tire circumferential direction are provided within a comparatively wide range in a tire transverse direction in the vicinity of the tire center, the entire rigidity of the land portions is high with respect to an input exerted in a tire circumferential direction, and it is thereby not concerned that uneven wear may occur. However, since angles of the inclining grooves 306 are fixed, rigidities of the land portions 308 become insufficient with respect to inputs during a motorcycle cornering at a large camber angle, and a problem is caused in that each tread end may easily unevenly wear thereby deteriorating steering stability due to an occurrence of uneven wear.

In view of the aforementioned facts, an object of the present invention is to solve the aforementioned drawbacks, and provide a pneumatic tire for a motorcycle in which both wear resistance and wet steering stability can be obtained.

DISCLOSURE OF THE INVENTION

The present invention relates to a pneumatic tire for a motorcycle, including: a tread which has a tread surface portion whose external surface curvature is comparatively large; a pair of zigzag circumferential direction grooves for defining a central continuous circumferential rib which is positioned at a central portion in a tire axial direction of the tread and which extends in a zigzag state continuously in a tire circumferential direction, which extend in a zigzag stage along the tire circumferential direction; and a plurality of pairs of inclining grooves, the inclining grooves being provided in the tire circumferential direction so as to be separated from each other at an interval at both sides in a tire transverse direction of the pair of zigzag circumferential direction grooves and being inclined with respect to the tire transverse direction such that each inclining groove extends from a tread end to a tire equatorial plane and terminates near the zigzag circumferential direction groove without contacting therewith, and an end portion of the inclining groove at a tire equatorial plane side is positioned further to a tire rotational direction side, than an end portion of the inclining groove at a tread end side, characterized in that the inclining groove has a sharp inclining groove portion which is positioned at the tire equatorial plane side, and whose angle with respect to the tire circumferential direction is within a range of 0 to 20 degrees, and a loose inclining groove portion which is positioned at an external side in the tire transverse direction of the sharp inclining groove portion and whose angle with respect to a tire circumferential direction is set larger than the angle of the sharp inclining groove portion, a first longitudinal land portion having a substantially uniform width and a second longitudinal land portion having a width which gradually increases in a direction opposite to the tire rotational direction are alternately connected to each other and arranged in the tire circumferential direction between sides forming a zigzag shape of the zigzag circumferential direction groove, due to that a main portion of the sharp inclining groove portion at the tire equatorial plane side is positioned so as to face the side forming a zigzag shape of the zigzag circumferential direction groove, and portions of one sharp inclining groove portion and another sharp inclining groove portion of the inclining grooves adjacent to each other in the tire circumferential direction are made to overlap one another in the tire transverse direction.

Next, operations and effects of the pneumatic tire for a motorcycle will be explained.

During a motorcycle travel on a wet road surface, in order to be careful with turning sideways, a camber angle becomes comparatively smaller, and portions in the vicinities of the tire equatorial plane mainly contact with road.

Since a pair of the zigzag circumferential direction grooves, which run in parallel to each other and extend in a zigzag state in a tire circumferential direction, is provided in the vicinity of the tire equatorial plane, drainage performance can be secured during a motorcycle travel on a wet road-surface (during a motorcycle straight drive~at the time of a small camber angle).

Assuming that a circumferential direction straight groove which extends linearly in a circumferential direction is provided in the vicinity of the tire equatorial plane, when a certain camber angle is exceeded, since the circumferential direction straight groove is suddenly separated from a road-contact surface, drainage performance suddenly deteriorates, thus deteriorating wet steering stability. However, when a pair of the zigzag circumferential direction grooves is provided in the vicinity of the tire equatorial plane, the zigzag shape is provided with amplitudes, and the zigzag circumferential direction groove is not suddenly separated from the road-contact surface when a certain camber angle is exceeded, thus preventing deterioration of wet steering stability.

During a motorcycle travel on a wet road surface, if a camber angle further increases, the sharp inclining groove portion of the inclining groove at either left side or right side enters a road-contact surface, and water on the road-contact surface is drained through the inclining groove. Further, the inclining groove is inclined with respect to a tire transverse direction such that an end portion of the inclining groove at the tire equatorial plane side is positioned further to a tire rotational direction side than to a tread end side. Accordingly, a so-called directional pattern is formed and water on the road-contact surface can be smoothly sucked and drained.

Further, portions near the tire equatorial plane of the tread do contain merely the zigzag circumferential direction grooves and the sharp inclining groove portions which are not connected to the zigzag circumferential direction grooves and each of which angle with respect to a tire circumferential direction is 0 to 20 degrees, and do not contain lug groove components which extend substantially in a tire axial direction. Accordingly, circumferential direction rigidities of the land portion at a tread central side, i.e., the central continuous rib, and the first and second longitudinal land portions increase. Consequently, wear resistance in the vicinity of the tire equatorial plane of the tread increases, and traction performance also increases during a motorcycle travel by the portions in the vicinity of the tire equatorial plane of the tread road-contacted.

Further, being different from a rib that linearly extends in a circumferential direction, the zigzag-shaped central continuous circumferential rib defined by the pair of the zigzag circumferential direction grooves has edge components in a tire transverse direction. Accordingly, the zigzag-shaped central continuous circumferential rib can exhibit a higher driving/braking force than in a case in which the rib that linearly extends in a circumferential direction is employed.

Main portions of the sharp inclining groove portions at the tire equatorial plane side are positioned so as to face sides forming a zigzag shape of the zigzag circumferential direction groove because a groove distance is maintained constant thus making rigidities of the land portions uniform.

In the present invention, the main portion of the sharp inclining groove portion refers to at least 30% of the entire length of the sharp inclining groove portion from an end portion at the tire equatorial plane side to an end portion at the tread end side.

Portions of one sharp inclining groove portion and another sharp inclining groove portion of the inclining grooves adjacent to each other in a tire circumferential direction are overlapped to one another in a tire transverse direction because a groove distance can be maintained constant, and rigidities of the land portions can be made uniform.

Further, since the loose inclining groove portion whose angle with respect to a tire circumferential direction is set larger than that of the sharp inclining groove portion is positioned, rigidities of the land portions adjacent to the loose inclining groove portions can be obtained so as to resist an input during a motorcycle cornering at a large camber angle. Accordingly, wear resistance in the tread side region can be enhanced.

The present invention may relate to a pneumatic tire for a motorcycle in which a tread crown radius at a tire equatorial plane portion as seen from a cross section along a tire rotational axis is equal to or less than 250 mm.

Next, an operation and an effect of the pneumatic tire for such a motorcycle will be explained.

Since a tread crown radius at a tire equatorial plane portion is equal to or less than 250 mm, a curvature for a motorcycle can be optimal.

When the tread crown radius exceeds 250 mm, if a camber angle is provided for a motorcycle (during a motorcycle cornering), there is a concern that a camber thrust cannot be taken.

Further, when the crown radius is excessively small, since a section width required for a tire cannot be sufficed, it is preferable that the crown radius is equal to or more than 30 mm.

The present invention may relate to a pneumatic tire for a motorcycle in which an amplitude of the zigzag shape of the zigzag circumferential direction groove is within a range of 50 to 100% of a road-contact width of a tire when the tire is attached to a standard rim, is filled with a standard air pressure, and receives a standard load in a state of a camber angle 0°, and a ½ wavelength of the zigzag shape of the zigzag circumferential direction groove is within a range of 50 to 150% of a road-contact length of the tire when the tire is attached to the standard rim, is filled with the standard air pressure, and receives the standard load in the state of the camber angle 0°.

Next, an operation and an effect of the pneumatic tire for such a motorcycle will be explained.

If an amplitude of the zigzag shape of the zigzag circumferential direction groove is less than 50% of a road-contact width, during a motorcycle cornering, in accordance with an increase of a camber angle, the zigzag circumferential direction groove is being separated from a road-contact surface, and if a certain camber angle is exceeded, an edge portion of the central continuous circumferential rib tends to suddenly separate from a road-contact surface, thereby leading to a concern that wet steering stability may be insufficient.

On the other hand, if an amplitude of the zigzag shape of the zigzag circumferential direction groove exceeds 100% of a road-contact width, due to an excessively large curvature of the zigzag shape of the zigzag circumferential direction groove, drainage performance in a tire circumferential direction is deteriorated thereby leading to a concern that drainage performance becomes insufficient. Further, a frequency at which the zigzag circumferential direction groove is positioned outside a road-contact surface increases, and drainage effects in a tire circumferential direction change unstably thereby leading to a concern that wet steering stability may deteriorate.

The present invention may relate to a pneumatic tire for a motorcycle in which the sharp inclining groove portion forming the first longitudinal land portion inclines in the same direction as the side of the zigzag circumferential direction groove that faces the sharp inclining groove portion, the sham inclining groove portion forming the second longitudinal land portion inclines in-an inverse direction to the side of the zigzag circumferential direction groove that faces the sham inclining groove portion, and a length in a tire circumferential direction of the second longitudinal land portion is shorter than that of the first longitudinal land portion.

Next, an operation and an effect of the pneumatic tire for such a motorcycle will be explained.

By inclining the sharp inclining groove portion forming the first longitudinal land portion in the same direction as a side of the zigzag circumferential direction groove that faces the sharp inclining groove portion forming the first longitudinal land portion, a width in a tire axial direction of the first longitudinal land portion can be made substantially uniform in a tire circumferential direction. However, by inclining the sharp inclining groove portion forming the second longitudinal land portion in an inverse direction to a side of the zigzag circumferential direction groove that faces the sharp inclining groove portion, a width in a tire axial direction of the second longitudinal land portion becomes larger toward a direction opposite to a tire rotational direction.

In the pneumatic tire for a motorcycle according to claim 4, since a length in a tire circumferential direction of the second longitudinal land portion is made shorter than that in a tire circumferential direction of the first longitudinal land portion, a circumferential direction change of a width in a tire axial direction of the second longitudinal land portion is reduced (in other words, a maximum width of the second longitudinal land portion is limited). Consequently, changes of rigidities of the land portions adjacent to each other in a tire axial direction can be suppressed, and steering stability can be secured.

The present invention may relate to a pneumatic tire for a motorcycle in which end portions at a tire equatorial plane side of one inclining groove and the other inclining groove of the pair of the inclining grooves may be positioned so as to have a phase difference in the tire circumferential direction with the tire equatorial plane interposed therebetween, and a phase difference of one pair of the inclining grooves and a phase difference of another pair of the inclining grooves adjacent to each other in the tire circumferential direction may be set in directions opposite to each other.

Next, an operation and an effect of the pneumatic tire for such a motorcycle will be explained.

In this pneumatic tire for a motorcycle, as compared to a case in which end portions of the inclining grooves at the tire equatorial plane side are arranged with the same phase difference, occurrences of changes in a negative rate due to a rolling in a road-contact region can be suppressed.

The present invention may relate to a pneumatic tire for a motorcycle in which one auxiliary inclining groove or two, which are extended from the tread end to the tire equatorial plane side to terminate near a boundary between the tread central region and the tread side region, and which are substantially in parallel to the inclining grooves adjacent to each other in the tire circumferential direction, are provided between the inclining grooves in the tire circumferential direction.

Next, an operation and an effect of the pneumatic tire for such a motorcycle will be explained.

In this pneumatic tire for a motorcycle, due to an existence of the auxiliary inclining grooves, drainage performance can be secured at the time of a large camber angle.

The present invention may relate to a pneumatic tire for a motorcycle in which the auxiliary inclining grooves are positioned between the inclining grooves in the tire circumferential direction such that a groove distance between the grooves in the tire circumferential direction is kept constant.

Next, an operation and an effect of the pneumatic tire for such a motorcycle will be explained.

In this pneumatic tire for a motorcycle, since auxiliary inclining grooves are arranged between the inclining grooves in a tire circumferential direction such that a groove distance between the grooves in a tire circumferential direction is kept constant, rigidities of the land portions can be made uniform.

The present invention may relate to a pneumatic tire for a motorcycle in which a width of the central continuous circumferential rib is within a range of 20 to 50% of a road-contact width of a tire when the tire is attached to a standard rim, is filled with a standard air pressure, and receives a standard load in a state of a camber angle 0 °.

Next, an operation and an effect of the pneumatic tire for such a motorcycle will be explained.

When a width of the central continuous circumferential rib is less than 20% of a road-contact width, the rigidity of the land portion of the central continuous circumferential rib becomes insufficient thereby leading to a concern that stability during a motorcycle straight drive, steering stability during a motorcycle cornering at the time of a small camber angle, and wear resistance may deteriorate.

On the other hand, when a width of the central continuous circumferential rib exceeds 50% of a road-contact width, a volume of grooves within a road-contact surface at a camber angle 0° or at a small camber angle decreases thereby leading to concerns that drainage performance in a circumferential direction cannot be secured especially during a motorcycle straight drive at high speed, and wet steering stability may deteriorate.

The pneumatic tire for a motorcycle may include an angle of the loose inclining groove portion to be measured from the tire rotational direction side to an external side in the tire axial direction with respect to the tire circumferential direction that is within a range of 90 to 150 degrees.

Next, an operation and an effect of the pneumatic tire for such a motorcycle will be explained.

When an angle of the loose inclining groove portion to be measured from a tire rotational direction side with respect to a tire circumferential direction is less than 90 degrees, at the time of a large camber angle during which the tread side region road-contacts, the grooves of the loose inclining groove portions run in a direction opposite to a direction in which water is drained thereby leading to a concern that wet steering stability may deteriorate.

On the other hand, when an angle of the loose inclining groove portion with respect to a tire circumferential direction to be measured from a tire rotational direction side exceeds 150 degrees, at the time of a large camber angle during which the tread side region road-contacts, length of an edge portion that faces an input direction, of the land portion between the loose inclining groove portions increases, and poor rigidity of the land portion is revealed thereby leading to a concern that wet steering stability may deteriorate.

The present invention may relate to a pneumatic tire for a motorcycle in which minimum widths of the respective land portions defined by grooves are substantially the same.

Next, an operation and an effect of the pneumatic tire for such a motorcycle will be explained.

In this pneumatic tire for a motorcycle, minimum widths between the respective land portions defined by grooves are substantially the same, whereby rigidities of the land portions can be made uniform.

The present invention may relate to a pneumatic tire for a motorcycle in which the sharp inclining groove portion and the loose inclining groove portion are smoothly connected to each other.

Next, an operation and an effect of the pneumatic tire for such a motorcycle will be explained.

Since the sharp inclining groove portion and the loose inclining groove portion are smoothly connected to each other, water can be drained smoothly toward the tread ends.

The present invention may relate to a pneumatic tire for a motorcycle in which the entire length of the inclining groove forming the first longitudinal land portion is longer, by 5 to 20%, than that of the inclining groove forming the second longitudinal land portion.

Next, an operation and an effect of the pneumatic tire for such a motorcycle will be explained.

Since the entire length of the inclining groove forming the first longitudinal land portion is longer, by 5 to 20%, than that of the inclining groove forming the second longitudinal land portion, rigidities of the first longitudinal land portion and the second longitudinal land portion can be made substantially equal.

The present invention may relate to a pneumatic tire for a motorcycle in which grooves, except for the zigzag circumferential direction grooves1, have substantially the same width which is within a range of 60 to 80% of a groove width of the zigzag circumferential direction groove.

Next, an operation and an effect of the pneumatic tire for such a motorcycle will be explained.

When grooves except for the zigzag circumferential direction grooves have a groove width which are less than 60% of a groove width of the zigzag circumferential direction groove, the groove width is excessively narrow thereby leading to a concern that drainage performance may deteriorate especially when a motorcycle travels at a high speed.

On the other hand, when groove widths of grooves except for the zigzag circumferential direction grooves exceed 80% of a groove width of the zigzag circumferential direction groove, a negative rate becomes excessively large thereby leading to a concern that tread rigidity deteriorate, and accordingly, wear resistance may deteriorate.

The present invention may relate to a pneumatic tire for a motorcycle in which a circumferential direction pitch length between grooves at the tread end is within a range of 20 to 50% of a road-contact length of a tire when the tire is attached to a standard rim, is filled with a standard air pressure, and receives a standard load in a state of a camber angle 0 °.

Next, an operation and an effect of the pneumatic tire for such a motorcycle will be explained.

When a circumferential direction pitch length between grooves at tread end is less than 20% of a road-contact length, a circumferential direction dimension of a land portion defined by grooves which are open toward the tread end is excessively narrow thereby leading to a concern that rigidity of the land portion may deteriorate, and accordingly, wear resistance may deteriorate.

On the other hand, when a circumferential direction pitch length between grooves at tread end exceeds 50% of a road-contact length, a volume rate of the grooves arranged in a road-contact surface is deteriorated thereby leading to a concern that drainage performance may deteriorate.

The present invention may relate to a pneumatic tire for a motorcycle in which a width of an end portion at the tire rotational direction side of the first longitudinal land portion and that of the second longitudinal land portion are within a range of 50 to 120% of a width of the central continuous circumferential rib.

Next, an operation and an effect of the pneumatic tire for such a motorcycle will be explained.

When a width of an end portion at a tire rotational direction side of the first longitudinal land portion and that of the second longitudinal land portion are respectively less than 50% of a width of the central continuous circumferential rib, rigidities of the land portions are excessively low thereby leading to a concern that both wear resistance and steering stability may deteriorate.

On the other hand, when a width of an end portion at a tire rotational direction side of the first longitudinal land portion and that of the second longitudinal land portion respectively exceed 120% of a width of the central continuous circumferential rib, rigidity step differences between the central continuous circumferential rib and the first and second longitudinal land portions rapidly increase, and steering stability becomes unstable when a camber angle varies, which is not preferable.

The present invention may relate to a pneumatic tire for a motorcycle in which an amplitude of the zigzag shape of the zigzag circumferential direction groove is within a range of 30 to 150% of a width of the central continuous circumferential fib.

Next, an operation and an effect of the pneumatic tire for such a motorcycle will be explained.

If an amplitude of the zigzag shape of the zigzag circumferential direction groove becomes less than 30% of a width of the central continuous circumferential rib, during a motor cycle cornering, when a camber angle increases, and the zigzag circumferential direction groove is separated from the road-contact surface, once a certain camber angle is exceeded, sudden separation of an edge of the central continuous circumferential rib from the road-contact surface easily tends to occur thereby leading to a concern that wet steering stability may be insufficient.

On the other hand, if an amplitude of the zigzag shape of the zigzag circumferential direction groove exceeds 150% of a width of the central continuous circumferential rib, due to an excessively large curvature of the zigzag shape of the zigzag circumferential direction groove thereby leading to a concern that drainage performance in a tire circumferential direction may deteriorate and accordingly, drainage performance may be insufficient. Further, a frequency at which the zigzag circumferential direction groove is positioned at an external side of a road-contact surface thereby leading to a concern that drainage effects in a tire circumferential direction change unstably, and wet steering stability may deteriorate.

The present invention may relate to a pneumatic tire for a motorcycle in which TH/SW is within a range of 0.25 to 0.45, given that a drop height measured in a tire radial direction between a tread maximum radial portion to a tire maximum width portion is TH, and a tire maximum width is SW, a road-contact length of a tire is within a range of 200 to 250% of a road-contact width when the tire is attached to a standard rim, is filled with a standard air pressure, and receives a standard load in a state of a camber angle 0°, and a road-contact shape is formed into a substantially ellipse configuration whose long axis is oriented in a tire circumferential direction.

Next, an operation and effect of the pneumatic tire for such a motorcycle will be explained.

When TH/SW is less than 0.25, due to a decrease of a road-contact surface pressure, there is a concern that drainage performance may deteriorate. Further, due to an excessive weight to a handling, there is a concern that steering stability may deteriorate.

On the other hand, when TH/SW exceeds 0.45, due to an excessive increase of the road-contact surface pressure, there is a concern that wear resistance may deteriorate.

Further, when a road-contact length becomes less than 200% of a road-contact width, due to an excessive reduction of a road-contact surface pressure, there is a concern that wet resistance may deteriorate.

On the other hand, when the road-contact length exceeds 250% of the road-contact surface, due to an excessive increase of a road-contact surface pressure, there is a concern that wear resistance may deteriorate.

The present invention may relate to a pneumatic tire for a motorcycle in which a negative rate is within a range of 30 to 40% in a region within a range 50% of a tread periphery width with the tire equatorial plane of the tread as a center, and a negative rate is within a range of 20 to 30% in a region at an external side in the tire transverse direction, with respect to the region within a range of 50% of the tread periphery width with the tire equatorial plane of the tread as a center.

Next, an operation and an effect of the pneumatic tire for such a motorcycle will be explained.

When a negative rate is less than 30% in a region within a range of 50% of a tread periphery width with tire equatorial plane of the tread as a center, since the negative rate is too low, there is a concern that drainage performance may deteriorate, and wet resistance especially during a motorcycle straight drive at high speed may deteriorate.

On the other hand, when a negative rate exceeds 40% in a region within a range of 50% of a tread periphery width with tire equatorial plane of the tread as a center, since the negative rate in this region is too high, there is a concern that wear resistance may deteriorate.

Further, when a negative rate in a region at an external side in a tire transverse direction with respect to the a region within a range of 50% of tread periphery width with the tire equatorial plane of the tread as a center is less than 20%, due to an excessively low negative rate in the region, there is a concern that drainage may deteriorate.

On the other hand, when a negative rate in a region at an external side in a tire transverse direction with respect to the a region within a range of 50% of tread periphery width with the tire equatorial plane of the tread as a center exceeds 30%, due to an excessively high negative rate, there is a concern that wear resistance may deteriorate when a transverse force is applied to a motorcycle and at the time of a large camber angle.

The present invention may relate to a pneumatic tire for a motorcycle in which an outer contour flatness in the tread central region is within a range of 0.4 to 0.7, and that in each of the tread side regions is within a range of 0.2 to 0.7, given that a tread crown radius/a tire maximum width is the outer contour flatness in the tread region within a range of 30 to 50% of a tread periphery width with a tire equatorial plane as a center is a tread central region, and regions at an external side in the tire transverse direction of the tread central region are respectively tread side regions.

Next, an operation and an effect of the pneumatic tire for such a motorcycle will be explained.

When an outer contour flatness in the tread central region is less than 0.4, due to an excessively high road-contact surface pressure, there is a concern that wear resistance may deteriorate.

On the other hand, when an outer contour flatness in the tread central region exceeds 0.7, due to an excessively low road-contact surface pressure, there is a concern that wet resistance may deteriorate.

Further, when an outer contour flatness in the tread side region is less than 0.2, due to an excessive decrease of a road-contact surface area during a motorcycle cornering, there is a concern that steering stability may particularly deteriorate.

On the other hand, when an outer contour flatness in the tread side region exceeds 0.7, due to an excessive low road-contact surface pressure during a motorcycle cornering, there is a concern that wet steering stability may particularly deteriorate.

The present invention may relate to a pneumatic tire for a motorcycle in which an angle of a groove wall at a groove stamping side of the inclining groove with respect to a normal line stood vertically on a road surface is within a range of 0 to 45°, and an angle of a groove wall at a groove kick-out side thereof with respect to the normal line stood vertically on the road surface is within a range of 0 to 45°, and the angle of the groove wall at the groove stamping side is smaller than that at the groove kick-out side.

Next, operations and effects of the pneumatic tire for such a motorcycle will be explained.

When an angle of a groove wall at a groove stamping side of the inclining groove is equal to or less than 0°, a rigidity of the groove wall becomes too low during a road-contacting, early uneven wear tends to occur.

On the other hand, when an angle of a groove wall at a groove stamping side of the inclining groove exceeds 45°, an effective edge operation during a road-contacting cannot be obtained thereby leading to a concern that wet steering stability may deteriorate. Further, it becomes difficult to obtain a sufficient groove volume required for drainage.

Further, when an angle of a groove wall at a groove kick-out side of the inclining groove is equal to or less than 0°, rigidities of the land portions resisting to an input at driving become too low thereby leading to a concern that wear resistance may deteriorate.

On the other hand, when an angle of a groove wall at a groove kick-out side of the inclining groove exceeds 45°, change of rigidities of the land portions when a tire is worn become large thereby leading to a concern that wet steering stability may deteriorate. Further, it becomes difficult to obtain a groove volume required for drainage.

Further, since a traction force is transmitted to a road-surface effectively with a rigidity of land portions sufficing for an edge of the groove wall at a stamping side of the inclining groove to firmly break water film of a road surface, an edge portion at a stamping side must be acute.

In this pneumatic tire for a motorcycle, since an angle of a groove wall at a groove stamping side of the inclined groove is made smaller than that at a groove kick-out side thereof, an edge portion of the groove wall at the groove-stamping side becomes sharper thus making it easier to tear water film and obtain larger traction force during a travelling of a motorcycle on a wet road surface.

The present invention may relate to a pneumatic tire for a motorcycle in which the respective groove depths are substantially the same in a region within a range of 50% of a tread periphery width as tire equatorial plane of the tread as a center.

Next, an operation and an effect of the pneumatic tire for such a motorcycle will be explained.

The respective groove depths are substantially the same in a region within a range of 50% of a tread periphery width as tire equatorial plane of the tread as a center, whereby rigidity levels of land portions within the aforementioned region are the same, and deterioration of drainage due to a change of groove depth can be prevented.

The present invention may relate to a pneumatic tire for a motorcycle in which the tire has a radial structure.

Next, an operation and an effect of the pneumatic tire for such a motorcycle will be explained.

The pneumatic tire for a motorcycle has a radial structure, which contributes to wear resistance on an asphalt road.

Further, in the present invention, a "standard rim" refers to that determined by the standards, as defined in YEAR BOOK of 2002 Year issued by JATMA (The Japan Automobile Tire Manufacturers Association, Inc.), the standard air pressures are those corresponding to the maximum load capacity, as defined in YEAR BOOK of 2002 Year issued by JATMA, and the standard loads are those corresponding to the maximum load capacity, as defined in YEAR BOOK of 2002 Year issued by JATMA.

In other countries than Japan, "load" represents a maximum load (maximum loading capacity) in the applied size specified in the following standards, the air pressure represents an air pressure corresponding to the maximum load (maximum loading capacity) of a single tire specified in the following standards, and the rim represents the standard rim in the applied size specified in the following standards (or "Approved Rim", "Recommended Rim").

The standards are determined by industrial standards valid for regions where tires are manufactured or used. For example, in U. S. A, those are determined by Year Book of The Tire and Rim Association Inc., and in Europe, by Standards Manual of The European Tire and Rim Technical Organization.

When TRA and ETRTO standards are employed in a place where a tire is used or produced, the individual standards must be followed.

In the present invention, the "road-contact surface" represents a tire-contact surface when a tire is attached to a standard rim, is filled with a standard air pressure, positioned vertically on a flat plate in a stationary state, and upon an application of a standard load.

In the present invention, the "road-contact length" is a length in a tire circumferential direction of the aforementioned "road-contact surface", and the "road-contact width" is a length in a tire axial direction of the aforementioned "road-contact surface".

Further, in the present invention, the "tread periphery width" is a size of a tread width measured along a tread surface from one end to the other end of a tire maximum width portion in a cross section of the tire along the rotational axis.

BEST MODE FOR CARRYING OUT THE INVENTION

With reference to FIGS. 1 to 4, a description of a pneumatic tire for a motorcycle according to an embodiment of the present invention will be made.

Figure 2:
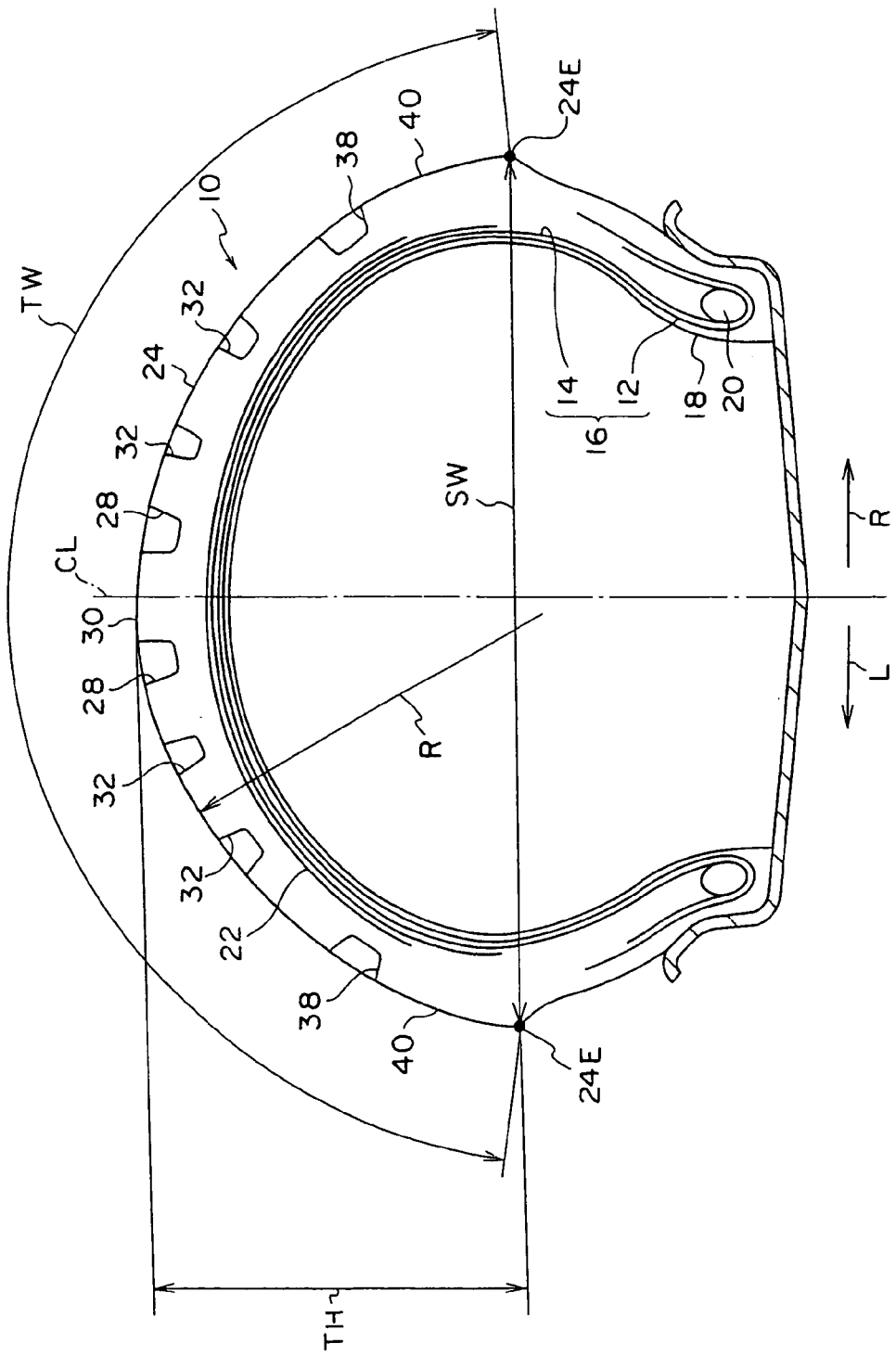
FIG. 2 is a cross-sectional view along a tire rotational shaft of a pneumatic tire for a motorcycle according to the first embodiment of the present invention.

A pneumatic tire for a motorcycle 10 according to the present embodiment has a tire size of 180/55ZR17 and, as shown in FIG. 2, has a carcass 16 comprising a first carcass ply 12 and a second carcass ply 14 in which a cord, which extend in a direction orthogonal to an equatorial plane CL of a tire (hereinafter, the tire equatorial plane CL), is embedded.

Both end portions of each of the first and second carcass plies 12 and 14 are curled around bead cores 20 embedded in bead portions 18 from an inner side to an outer side of a tire.

A circumferential direction belt layer 22 is provided at an external side in a radial direction of a tire.

A tread 24 is positioned outside the circumferential direction belt layer 22 in a tire radial direction.

A tread crown radius R at the tire equatorial plane CL is within a range of 70 to 200 mm.

It is preferable that TH/SW is within a range of 0.25 to 0.4, given that a drop height measured in a tire radial direction from a maximum radius portion to each of tread ends 24E of the tread 24 (i.e., a tire maximum width portion) is TH, and a tire maximum width of the tread 24 is SW.

Figure 1:
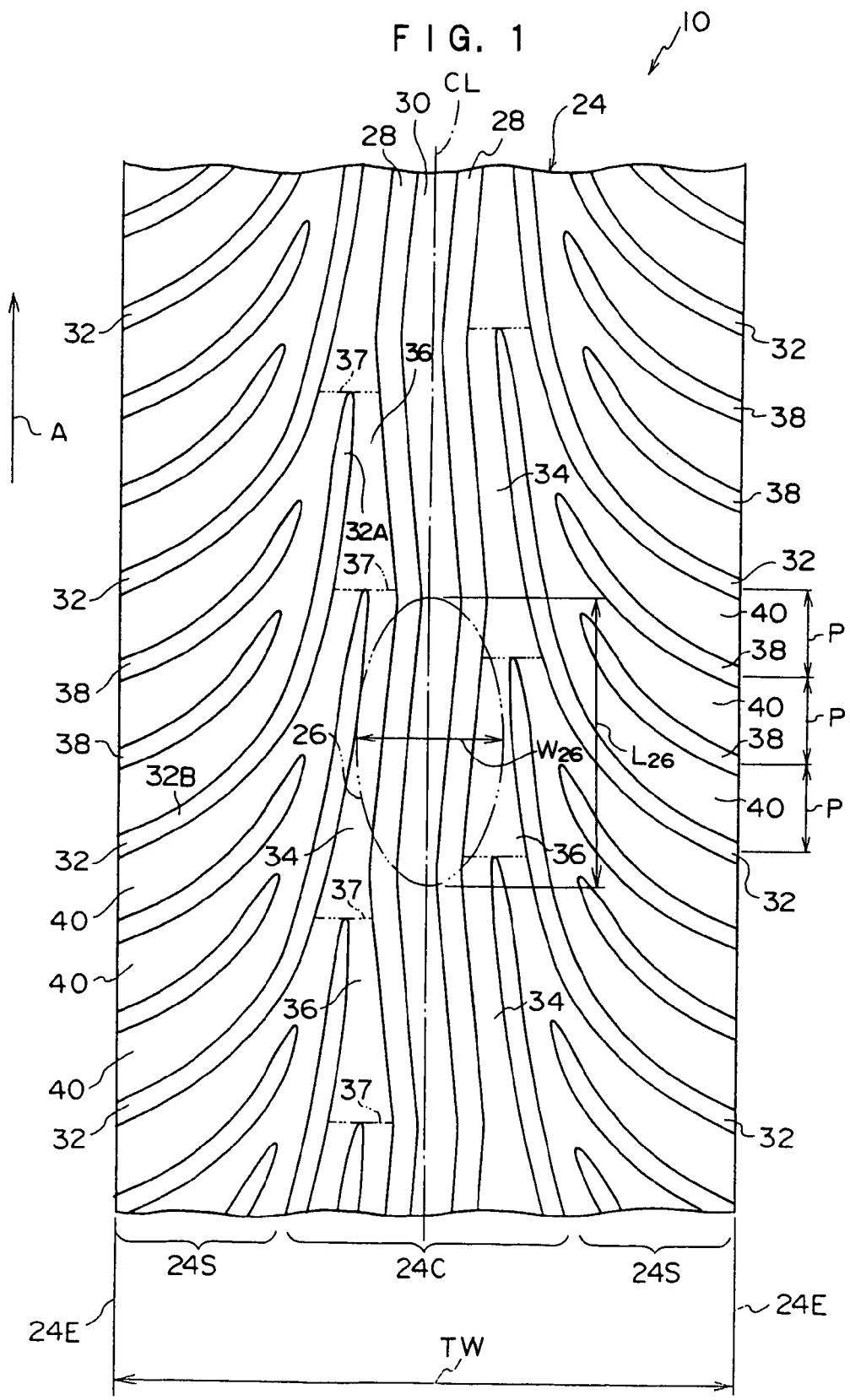
FIG. 1 is an evolved view of a tread of a pneumatic tire for a motorcycle according to a first embodiment of the present invention.

As shown in FIG. 1, it is preferable that a road-contact length $L_{26}$ of a road-contact surface 26 of the pneumatic tire for a motorcycle 10 is within a range from 200 to 250% of a road-contact width $W_{26}$, and it is also preferable that the road-contact surface 26 is formed into a substantially ellipse configuration whose long axis is oriented in a tire circumferential direction.

Here, in the present embodiment, "a tread crown radius R/a tire maximum width SW" is referred to as an outer contour flatness. Further, a region within a range of 30 to 50% of a tread periphery width TW with the tire equatorial plane CL as a center is referred to as a tread central region 24C, and each of regions outside in a transverse direction of a tire of the tread central region 24C is referred to as a tread side region 24S.

It is preferable that an outer contour flatness in the tread central region 24C is within a range of 0.4 to 0.7, and it is preferable that an outer contour flatness in the tread side region 24S is within a range of 0.2 to 0.7.

A pair of zigzag circumferential direction grooves 28 which extend in a zigzag state in a circumferential direction of a tire and run in parallel to each other is provided at a central portion in a tire axial direction of the tread 24 of the pneumatic tire for a motorcycle 10 according to the present embodiment.

For this reason, a central continuous circumferential rib 30, which extends in a zigzag state continuously in a tire circumferential direction, is defined by the pair of the zigzag circumferential direction grooves 28 on the tire equatorial plane CL of the tread 24.

Figure 3:
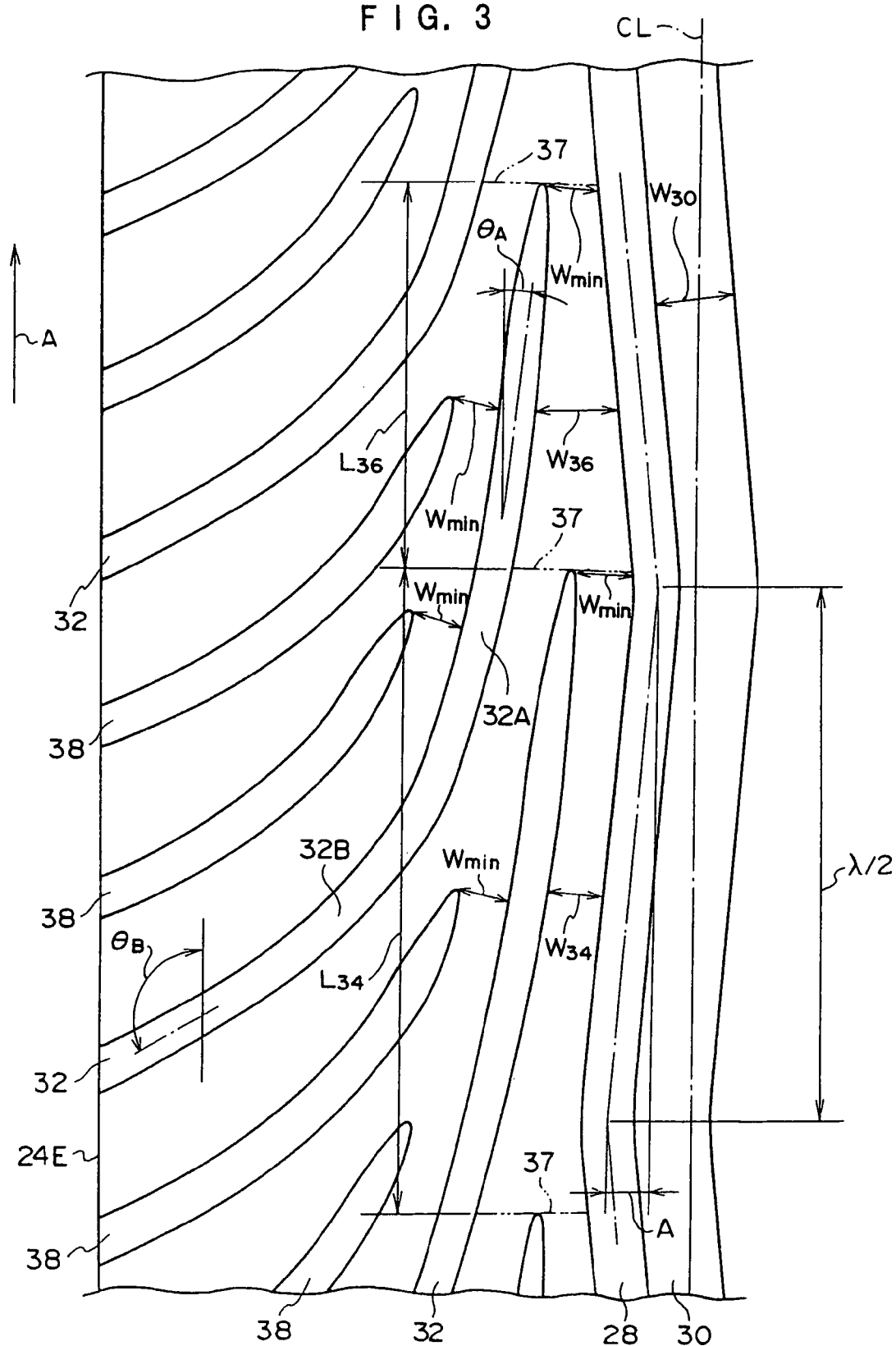
FIG. 3 is a partial enlarged view of the tread shown in FIG. 1.

As shown in FIG. 3, it is preferable that a width $W_{30}$ of the central continuous circumferential rib 30 is within a range of 20 to 50% of road-contact width $W_{26}$ of the road-contact surface 26 in a case in which the pneumatic tire for a motorcycle 10 is attached to a standard rim, is filled with a standard air pressure, and receives a standard load in a state of a camber angle 0°.

The zigzag circumferential direction groove 28 is formed into a zigzag shape having linear sides, which incline inversely to one another, are mutually connected in a tire circumferential direction.

It is preferable that amplitude A of the zigzag shape of the zigzag circumferential direction groove 28 is within a range of 50 to 100% of road-contact width $W_{26}$ of the road-contact surface 26.

It is also preferable that amplitude A of the zigzag shape of the zigzag circumferential direction groove 28 is within a range of 30 to 150% of width $W_{30}$ of the central continuous circumferential rib 30.

It is preferable that ½ wavelength i.e., λ/2 of the zigzag shape of the zigzag circumferential direction groove 28 is within a range of 50 to 150% of road-contact length $L_{26}$ of the road-contact surface 26.

As shown in FIG. 1, a plurality of pairs of inclining grooves 32 is provided. The inclining grooves in each pair are provided at both sides of the zigzag circumferential direction groove 28 in a tire transverse direction. Each pair is separated from one another in a tire circumferential direction at a certain distance. The inclining grooves 32 extend from the respective tread ends 24E to the tire equatorial plane CL, terminates near the respective zigzag circumferential direction grooves 28 without contacting therewith, and incline with respect to a tire transverse direction such that end portions of the inclining grooves 32 at the tire equatorial plane CL are located further in a rotational direction of a tire (a direction of arrow A) than those of the inclining grooves 32 at the tread ends 24E sides.

Hereinafter, in the present embodiment, in the inclining groove 32, a portion which is positioned in the tread central region 24C and whose angle with respect to a tire circumferential direction is comparatively small is referred to as a "sharp inclining groove portion 32A", and a portion which is positioned in the tread side region 24S and whose angle with respect to the circumferential direction of the tire is larger than that of the sharp inclining groove portion 32A is referred to as a "loose inclining groove portion 32B".

Here, it is preferable that angle $\theta_A$ of the sharp inclining groove portion 32A with respect to a tire circumferential direction is within a range of 0 to 20 degrees.

On the other hand, it is preferable that angle $\theta_B$ of the loose inclining groove portion 32B to be measured from a tire rotational direction side to an external side in a tire axial direction with respect to a tire circumferential direction is within a range of 90 to 150 degrees.

In the present embodiment, the sharp inclining groove portion 32A is formed into a substantially linear shape, and the loose inclining groove portion 32B is formed into a substantially circular arc shape.

As shown in FIG. 1, it is preferable that the sharp inclining groove portion 32A and the loose inclining groove portion 32B are smoothly connected to each other by the inclinations thereof being gradually changed.

A main portion of the sharp inclining groove portion 32A at the tire equatorial plane CL side (in the present embodiment, the main portion has at least 20% of the entire length of the sharp inclining groove portion 32A, extending from an end portion of the sharp inclining groove portion 32A at the tire equatorial plane CL side toward the tread end side thereof) is located so as to face a linear side forming a zigzag shape of the zigzag circumferential direction groove 28.

Further, the inclining grooves 32 are respectively positioned such that portions of the sharp inclining groove portions 32A adjacent to each other in a tire circumferential direction overlap one another in a tire transverse direction. First longitudinal land portions 34 and second longitudinal land portions 36 are positioned at an external side of the zigzag circumferential direction groove 28 in a tire transverse direction, and are alternately connected to each other in a tire circumferential direction. The first longitudinal land portion 34 is formed between a linear side forming a zigzag shape of the zigzag circumferential direction groove 28 and the sharp inclining groove portion 32A, and has a substantially uniform width in a tire axial direction. A second longitudinal land portion 36 is formed between a linear side for forming a zigzag shape of the zigzag circumferential groove 28 and the sharp inclining groove portion 23A, and has a width in a tire axial direction, which gradually increases in a direction opposite to a tire rotational direction.

The sharp inclining groove portion 32A forming the first longitudinal land portion 34 is inclined in the same direction as a side of the zigzag circumferential direction groove 28 that faces the sharp inclining groove portion 32A forming the first longitudinal land portion 34, the sharp inclining groove portion 32A forming the second longitudinal land portion 36 is inclined in an inverse direction to a side of the zigzag circumferential direction groove 28 that faces the sharp inclining groove portion 32A forming the second longitudinal land portion 36, and a length in a tire circumferential direction of the second longitudinal land portion 36 is made shorter than that of the first longitudinal land portion 34, which is preferable.

A chain double-dashed line 37 in this figure is a boundary line between the first longitudinal land portion 34 and the second longitudinal land portion 36.

It is preferable that the entire length of the inclining groove 32 forming the first longitudinal land portion 34 (a length measured along the groove) is longer by 5 to 20% than that of the inclining groove 32 forming the second longitudinal land portion 36 (a length measured along the groove).

Further, as shown in FIG. 3, it is preferable that minimum widths $W_{min}$ of the land portions, each of which is sandwiched by at least two grooves, are substantially the same (difference of the widths is within ±20%).

It is preferable that a width of an end portion at a tire rotational direction side of the first longitudinal land portion 34 (a minimum width in the present embodiment) and that of the second longitudinal land portion (a minimum width in the present embodiment) are respectively within a range of 50 to 120% of a width $W_{30}$ of the central continuous circumferential rib 30.

As shown in FIG. 1, it is preferable that an end portion of one inclining groove 32 at the tire equatorial plane CL side (terminal end portion) and that of the other inclining groove 32 at the tire equatorial plane CL side (terminal end portion), of a pair of the inclining grooves 32 with the tire equatorial plane CL interposed therebetween, are positioned so as to have a phase difference therebetween in a tire circumferential direction, and phase difference of one pair of the inclining grooves 32 and phase difference of another pair of the inclining grooves 32, the pairs adjacent to each other in a tire circumferential direction, are set in directions opposite to each other. Further, an end portion of one inclining groove 32 at the tread end 24E side and that of the other inclining groove 32 at the tread end 24E side, of a pair of the inclining grooves 32, with the tire equatorial plane CL interposed therebetween, do not have a substantial phase difference therebetween in a tire circumferential direction.

It is preferable that phase difference between one inclining groove 32 and the other inclining groove 32 is 135 to 225 degrees, given that 1 pitch is 360 degrees.

Figure 4:
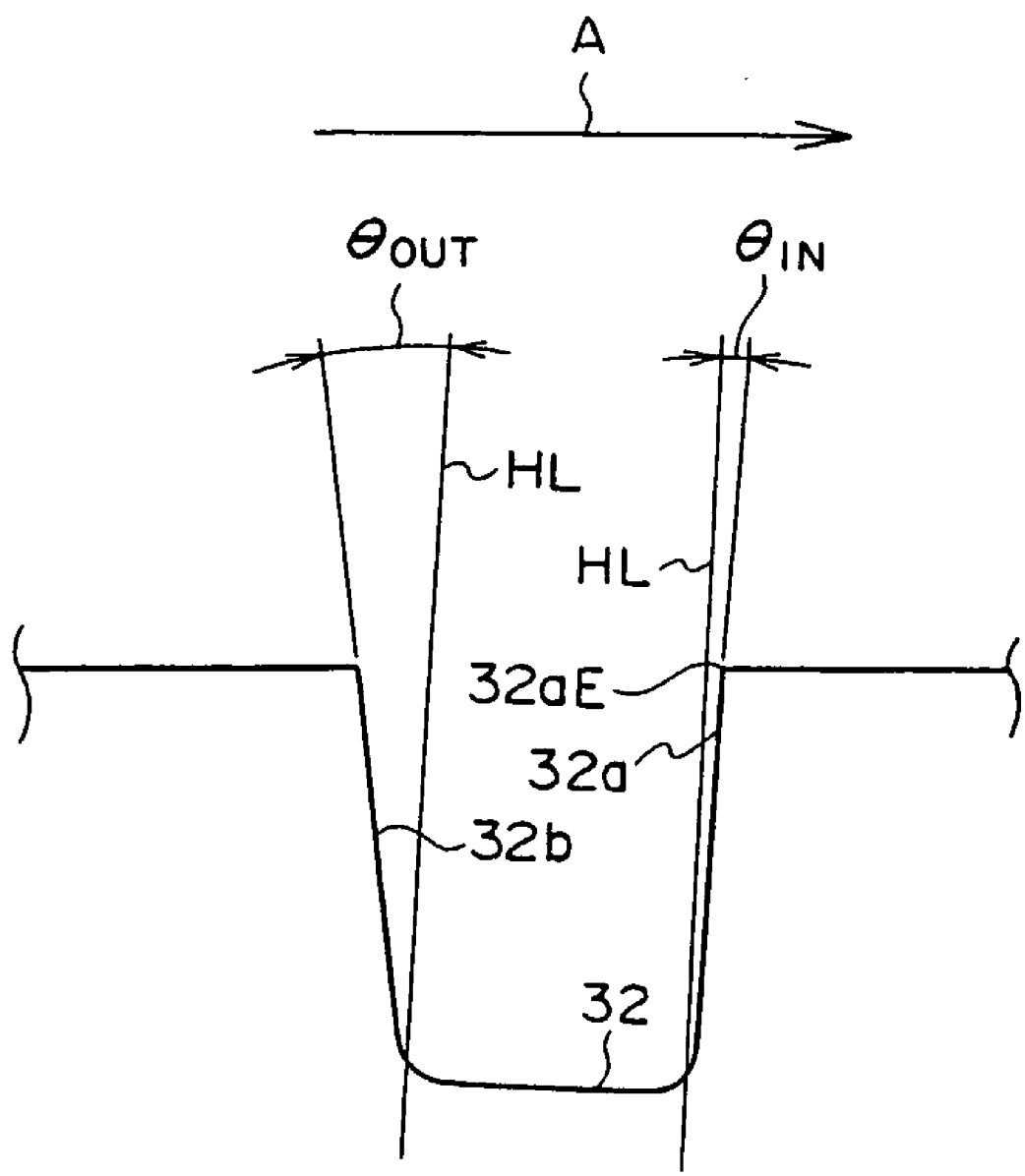
FIG. 4 is an enlarged cross-sectional view of the tread.

As shown in FIG. 4, it is preferable that angle $\theta_{IN}$ of a groove wall 32a (groove wall at an external side in a tire transverse direction) at a groove stamping side (from a viewpoint of a land portion, a land portion kick-out side) of the inclining groove 32 with respect to a normal line HL erected on a tread surface is within a range of 0° to 45°, and angle $\theta_{OUT}$ of a groove wall 32b at a groove kick-out side (from a viewpoint of a land portion, a land portion stamping side) of the inclining groove 32 with respect to a normal line HL erected on a tread surface is within a range of 0° to 45°, and it is preferable that angle $\theta_{IN}$ of the groove wall 32a at the groove stamping side of the inclining groove 32 is smaller than angle $\theta_{OUT}$ of the groove wall 32b at the groove kick-out side thereof.

As shown in FIG. 1, it is preferable that, between inclining grooves 32, one or two auxiliary grooves 38, which extend from the tread end 24E to the tire equatorial plane CL, terminate in a vicinity of a boundary between the tread central region 24C and the respective tread side region 24S, and are substantially in parallel to the inclining groove 32 adjacent thereto, is/are provided. In the present embodiment, two auxiliary grooves 38 are provided between the inclining grooves 32 in a tire circumferential direction at an equal interval.

Further, it is preferable that, in the present embodiment, the inclining grooves 32 and the auxiliary grooves 38 except for the zigzag circumferential direction grooves 28 have substantially the same groove width (a difference between groove widths is within ±20%), and have a groove width ranging from 60 to 80% of a groove width of the zigzag circumferential direction groove 28.

It is preferable that a circumferential direction pitch length P between grooves at the tread end 24E is within a range of 20 to 50% of the road-contact length $L_{26}$.

It is preferable that the respective groove depths are substantially the same (a difference between groove depths is within ±5%) in a region within a range of 50% of tread periphery width TW with the tire equatorial plane CL of the tread 24 as a center.

It is preferable that a negative rate is within a range of 30 to 40% in a region within a range 50% of tread periphery width TW with the tire equatorial plane CL of the tread 24 as a center, and that a negative rate is within a range of 20 to 30% in a region at an external side in a tire transverse direction with respect to the region within a range of 50% of tread periphery width TW with the tire equatorial plane CL of the tread as a center.

(Operation)

Next, an operation of the pneumatic tire for a motorcycle 10 according to the present embodiment will be explained.

In the pneumatic tire for a motorcycle 10 according to the present embodiment, since the pair of the zigzag circumferential direction grooves 28 is provided at the tread central region 24C, drainage can be secured when a motorcycle travels on a wet road surface (during a motorcycle straight drive~at the time of a small camber angle).

Further, since the zigzag circumferential direction groove 28 has amplitude, it never happens that a tire is rapidly separated from a road-contact surface even when a certain camber angle is exceeded, thus suppressing deterioration of wet steering stability.

If a camber angle further increases during a motorcycle traveling on a wet road, the sharp inclining groove portions 32A of the inclining grooves 32 at either left or right side of the tread enters the road-contact surface, and water within the road-contact surface is drained through the inclining grooves 32, thus obtaining excellent wet performance.

Further, the inclining grooves 32 and the auxiliary grooves 38 are inclined with respect to a tire transverse direction such that end portions of the inclining grooves 32 and the auxiliary grooves 38 at the tire equatorial plane CL side are positioned closer to a tire rotational direction than those thereof at sides of the tread ends, that is, a so-called directional pattern is formed on the tread 24, and accordingly, water within a ground can be sucked by the tread smoothly and drained at an external side in a tire axial direction.

Only the zigzag circumferential direction grooves 28 and the sharp inclining groove portions 32A are positioned in the tread central region 24C, and accordingly, there is no so-called lug groove component, whereby the respective circumferential direction rigidities of the central continuous circumferential rib 30, the first longitudinal land portions 34, and the second longitudinal land portions 36 within the tread central region 24C increase. For this reason, wear resistance of the tread central region 24C increases, and traction performance during a motorcycle traveling with the tread central region 24C road-contacted increases as well.

Moreover, since the zigzag-shaped central continuous circumferential rib 30 has edge components in a tire transverse direction, higher driving/braking force can be obtained than in a case where a rib that extends linearly in a tire circumferential direction is provided.

Since main portions of the sharp inclining groove portions 32A of the inclining grooves 32 at the tire equatorial plane side are positioned so as to face the respective sides forming a zigzag shape, of the zigzag circumferential direction grooves 28, a groove distance between a main portion of the sharp inclining groove portion 32A and the zigzag circumferential direction groove 28 is made constant, whereby rigidity of a land portion between the main portion of the sharp inclining groove portion 32A and the zigzag circumferential direction groove 28 can be made uniform.

Since portions of the sharp inclining groove portions 32A adjacent to each other, of the inclining grooves 32 in a tire circumferential direction overlap one another in a tire transverse direction, a minimum groove distance between the zigzag circumferential direction groove 28 and the sharp inclining groove portion 32A, and that between the sharp inclining groove portions 32A adjacent to each other are made uniform, thus making it possible to reduce a rigidity difference.

Since the loose inclining groove portion 32B and the auxiliary inclining groove 38, whose angles are set larger than those of the sharp inclining groove portion 32A, are positioned at the tread side region 24S, rigidity of a land portion 40 defined by the loose inclining groove portion 32B and the auxiliary inclining groove 38, resisting to an input during a motorcycle cornering at the time of a large camber angle, can be obtained, thus improving wear resistance of the tread side regions 24S.

By inclining the sharp inclining groove portion 32A forming the first longitudinal land portion 34 and a side that faces the sharp inclining groove portion 32A, of the zigzag circumferential direction groove 28 in the same direction, a tire axial direction width of the first longitudinal land portion 34 can be made substantially uniform in a tire circumferential direction. On the other hand, by inclining the sharp inclining groove portion 32A forming the second longitudinal land portion 36 inversely to a side that faces the sharp inclining groove portion 32A, of the zigzag circumferential direction groove 28, a tire axial direction width of the second longitudinal land portion 36 gradually becomes larger in a direction opposite to a tire rotational direction.

However, in the pneumatic tire for a motorcycle 10 according to the present embodiment, since length $L_{36}$ of the second longitudinal land portion 36 in a tire circumferential direction is made less than length $L_{34}$ of the first longitudinal land portion 34 in a tire circumferential direction, a circumferential direction change of a tire axial direction width $W_{36}$ of the second longitudinal land portion 36 is lessened. Consequently, a rigidity variation between land portions adjacent to each other in a tire axial direction is suppressed, thus obtaining steering stability.

A pair of the inclining grooves 32 is positioned so as to have a phase difference in a tire circumferential direction between one inclining groove 32 and the other inclining groove 32 thereof with the tire equatorial plane CL interposed therebetween, and phase difference of one pair of the inclining grooves 32 and phase difference of another pair, the pairs adjacent to each other in a tire circumferential direction are set in directions opposing each other. Accordingly, as compared to a case where pairs of the inclining grooves 32 are arranged in a state of the same phase, change of a negative rate due to a tire roll in a road-contact region can be suppressed.

Since two auxiliary inclining grooves 38 are provided at an equal distance between the inclining grooves 32 in a tire circumferential direction, drainage can be obtained when a large camber angle is provided for a tire.

Since two auxiliary inclining grooves 38 are provided between the inclining grooves 32 in a tire circumferential direction, a groove distance * between the inclining groove 32 and the auxiliary inclining groove 38, and that between the auxiliary inclining grooves 38 become substantially constant, thus making it possible to reduce a rigidity difference level between land portions.

Since minimum widths of the respective land portions are made substantially equal, there are few land portions that have locally weak rigidity, thus making it possible to reduce rigidity difference level between land portions.

Since the sharp inclining groove portion 32A and the loose inclining groove portion 32B are smoothly connected to each other, water can be smoothly flown toward the tread end 24E.

By making the entire length of the inclining groove 32 forming the first longitudinal land portion 34 longer, by 5 to 20%, than that of the inclining groove 32 forming the second longitudinal land portion 36, rigidities of the first longitudinal land portion 34 and the second longitudinal land portion 38 can be made substantially equal to each other.

Further, when amplitude A of the zigzag shape of the zigzag circumferential direction groove 28 becomes less than 50% of road-contact width $W_{26}$, during a motorcycle cornering, when a camber angle increases, and the zigzag circumferential direction groove 28 is separating from a road-contact surface, when the camber angle exceeds a certain point, edges of the central continuous circumferential rib 30 tend to be rapidly separated from a road-contact surface, and accordingly, there is a concern that wet steering stability becomes insufficient.

On the other hand, when amplitude A of the zigzag shape of the zigzag circumferential direction groove 28 exceeds 100% of the road-contact width $W_{26}$, a curvature of the zigzag shape of the zigzag circumferential direction groove 28 becomes too large, and accordingly, there is a concern that drainage in a circumferential direction is deteriorated, and drainage becomes insufficient. Further, a frequency at which the zigzag circumferential direction groove 28 becomes outside the road-contact surface 26 increases, and accordingly, there is a concern that drainage effects in a tire circumferential direction vary unstably thus deteriorating wet steering stability.

When a width of the central continuous circumferential rib 30 becomes less than 20% of the road-contact width, land portion rigidity of the central continuous circumferential rib 30 becomes insufficient, and accordingly, there is a concern that straight drive stability, steering stability during a motorcycle cornering at the time of a small camber angle, and wear resistance may deteriorate.

On the other hand, when a width of the central continuous circumferential rib 30 exceeds 50% of the road-contact width, a total volume of grooves within a road-contact surface at a camber angle of 0° and at a small camber angle decreases, thus making it difficult to obtain drainage in a tire circumferential direction especially during a motorcycle straight drive at high speed, and accordingly, there is a concern that wet steering stability may deteriorate.

When an angle of the loose inclining groove portion 32B, formed with respect to a tire circumferential direction and measured from a tire rotational direction side, is less than 90°, at the time of a large camber angle when the tread side region 24S road-contacts, grooves run in a reverse direction from a direction in which water is drained, there is a concern that wet steering stability may deteriorate.

On the other hand, an angle of the loose inclining groove portion 32B, formed with respect to a tire circumferential direction and measured from a tire rotational direction exceeds 150°, at the time of a large camber angle when the tread side region 24S road-contacts, since an edge portion of a land portion between the loose inclining groove portions 32B that faces an input direction becomes longer, there is a concern that weakness of rigidity of the land portion is revealed, and wet steering stability may deteriorate.

In the tread central region 24C, when a groove width of a groove (inclining groove 32) except for the zigzag circumferential direction groove 28 is less than 60% of that of the zigzag circumferential direction groove 28, the groove width is too narrow, and accordingly, there is a concern that drainage during a motorcycle travel at high speed may deteriorate.

On the other hand, in the tread central region 24C, when a groove width of a groove (inclining groove 32) except for the zigzag circumferential direction groove 28 exceeds 80% of that of the zigzag circumferential direction groove 28, a negative rate becomes too large, and accordingly, there is a concern that tread rigidity may deteriorate and wear resistance may become poor.

When a circumferential pitch length P between grooves in the tread end 24E is less than 20% of road-contact length $L_{26}$, a circumferential size of the land portion 40 defined by grooves (the inclining grooves 32 and the auxiliary inclining grooves 38) which are open in the tread end 24E is too small, and accordingly, there is a concern that rigidity may deteriorate and wear resistance may deteriorate.

On the other hand, when a circumferential pitch length P between grooves (the inclining grooves 32 and the auxiliary inclining grooves 38) in the tread end 24E exceeds 50% of road-ontact length $L_{26}$, there is a concern that a volume rate of grooves positioned within the road-contact surface may decrease, and drainage performance may deteriorate.

When a width of an end portion of the first longitudinal land portion 34 at a tire rotational direction side (in the present embodiment, a minimum width) and a width of an end portion of the second longitudinal land portion 36 at a tire rotational direction side (in the present embodiment, a minimum width) are respectively less than 50% of width $W_{30}$ of the central continuous circumferential rib 30, rigidity of land portions becomes excessively low, and accordingly, there is a concern that wear resistance as well as steering stability may deteriorate.

On the other hand, a width of an end portion of the first longitudinal land portion 34 at a tire rotational direction side, and a width of an end portion of the second longitudinal land portion 36 at a tire rotational direction side respectively exceed 120% of width $W_{30}$ of the central continuous circumferential rib 30, a rigidity difference between the first and second longitudinal land portion 34 and 36, and the central continuous circumferential rib 30 much increased, and accordingly, steering stability during a change of a camber angle becomes irregular, which is not preferable.

Further, when angle $\theta_A$ at a terminal end portion of the sharp inclining groove portion 32A with respect to a tire circumferential direction exceeds 20°, some portions at which a distance between the sharp inclining groove portion 32A and the zigzag circumferential direction groove 28 is excessively wide are formed, and accordingly, there is a concern that a rigidity difference may occur.

If amplitude A of the zigzag shape of the zigzag circumferential direction groove 28 is less than 250% of a width of the central continuous circumferential rib 30, during a motorcycle cornering, when a camber angle is increased, and the zigzag circumferential direction groove 28 is being separated from a road-contact surface, when a camber angle exceeds a certain point, edges of the central continuous circumferential rib 30 tend to be rapidly separated from a road-contact surface, and accordingly, there is a concern that wet steering stability becomes insufficient.

On the other hand, when amplitude A of the zigzag shape of the zigzag circumferential direction groove 28 exceeds 350% of a width of the central continuous circumferential rib 30, a curvature of the zigzag shape of the zigzag circumferential direction groove 28 becomes too large, and accordingly, there is a concern that drainage in a tire circumferential direction may deteriorate and drainage becomes insufficient.

Further, a frequency at which the zigzag circumferential direction groove 28 becomes outside the road-contact surface increases, and accordingly, there is a concern that drainage effects in a tire circumferential direction may vary unstably thus deteriorating wet steering stability.

When TH/SW is less than 0.25, there is a concern that drainage may deteriorate due to a decrease of a road-contact surface pressure, and steering stability may deteriorate due to an excessive load application to a handle operation.

On the other hand, when TH/SW exceeds 0.45, there is a concern that wear resistance may deteriorate due to an excessive increase of a road-contact surface pressure.

Further, when road-contact length $L_{26}$ is less than 200% of road-contact width $W_{26}$, there is a concern that wet resistance may deteriorate due to an excessively low road contact surface pressure.

On the other hand, when road-contact length $L_{26}$ exceeds 250% of road-contact width $W_{26}$, there is a concern that wear resistance may deteriorate due to an excessively high road-contact surface pressure.

When a negative rate is less than 30% in a region within a range of 50% of tread periphery width TW with the tire equatorial plane CL of the tread 24 as a center, there is a concern that, due to an excessively low negative rate, drainage performance may deteriorate, and wet resistance may deteriorate especially during a motorcycle straight drive at high speed.

On the other hand, when a negative rate exceeds 40% in a region within a range of 50% of tread periphery width TW with the tire equatorial plane CL of the tread 24 as a center, there is a concern that wear resistance may deteriorate due to an excessively high negative rate.

When a negative rate is less than 20% in a region at an external side in a tire transverse direction of the region within a range of 50% of tread periphery width TW with the tire equatorial plane CL of the tread 24 as a center, there is a concern that drainage performance may deteriorate due to an excessively low negative rate.

On the other hand, when a negative rate exceeds 30% in a region at an external side in a tire transverse direction of the region within a range of 50% of tread periphery width TW with the tire equatorial plane CL of the tread 24 as a center, there is a concern that, due to an excessively high negative rate, when a lateral force is applied thereto, at a large camber angle, wear resistance may deteriorate.

When an outer contour flatness in the tread central region 24C is less than 0.4, there is a concern that wear resistance may deteriorate due to an excessively high road-contact surface pressure.

On the other hand, when an outer contour flatness in the tread central region 24C exceeds 0.7, there is a concern that wet resistance may deteriorate due to an excessively low road-contact surface pressure.

Further, when an outer contour flatness in the tread side regions 24S is less than 0.2, there is a concern that steering stability may deteriorate due to an excessive decrease of a road-contact surface area during a motorcycle cornering.

On the other hand, when an outer contour flatness in the tread side regions 24S exceeds 0.7, there is a concern that wet steering stability may particularly deteriorate due to an excessively low road-contact surface pressure during a motorcycle cornering.

When angle $\theta_{IN}$ of a groove wall 32a at a stamping side of the inclining groove 32 is equal to or less than 0°, there is a concern that due to an excessively low rigidity of the groove wall 32a during a road-contact of a tire, uneven wear easily occurs at an earlier stage.

On the other hand, when angle $\theta_{IN}$ of a groove wall 32a at a stamping side of the inclining groove 32 exceeds 45°, effective edge operation during a road-contact of a tire cannot be obtained, and accordingly, there is a concern that wet steering stability may deteriorate.

Further, when angle $\theta_{OUT}$ of a groove wall 32b at a groove kick-out side of the inclining groove 32 is equal to or less than 0°, there is a concern that wear resistance may deteriorate due to an excessively low rigidity of land portions with respect to input at the time of a motorcycle driving.

On the other hand, when angle $\theta^{OUT}$ of a groove wall 32b at a kick-out side of the inclining groove 32 exceeds 45°, there is a concern that wet steering stability may deteriorate due to a considerable change of rigidity of land portions when a tire is worn.

Further, since a traction force is transmitted to a road-surface effectively with an edge of the groove wall 32a at a stamping side of the inclining groove 32 surely breaking water film of a road surface and sufficient land portion rigidity, an edge portion 32aE at a stamping side must be acute.

In the pneumatic tire for a motorcycle 10 according to the present embodiment, since angle $\theta_{IN}$ of the groove wall 32a at a stamping side of the inclining groove 32 is smaller than angle $\theta_{OUT}$ at a kick-out side of the inclining groove 32, the edge portion 32aE at a stamping side of the inclining groove 32 becomes acute, and water film can easily be broken, whereby a large traction force can be obtained during a motorcycle travel on a wet road surface.

In a region within a range of 50% of tread periphery width TW as the tire equatorial plane CL of the tread 24 as a center, since the respective groove depths are substantially the same, a rigidity level of land portions in the aforementioned region can be made uniform, and deterioration of drainage performance due to a change of a groove depth can be prevented.

Since the pneumatic tire for a motorcycle 10 of the present invention has a radial structure, it can provide an effective wear resistance for an asphalt road.

EXAMPLES

In order to confirm effects of the present invention, a tire in Example to which the present invention was employed, two tires in Conventional Examples, and two tires in Comparative Examples are prepared to compare feeling evaluations at the times of braking, cornering, and traction of a motorcycle, and durabilities thereof.

Test tires will be explained hereinafter.

A tire in Example is a pneumatic tire for a motorcycle explained in the present embodiment.

Figure 5:
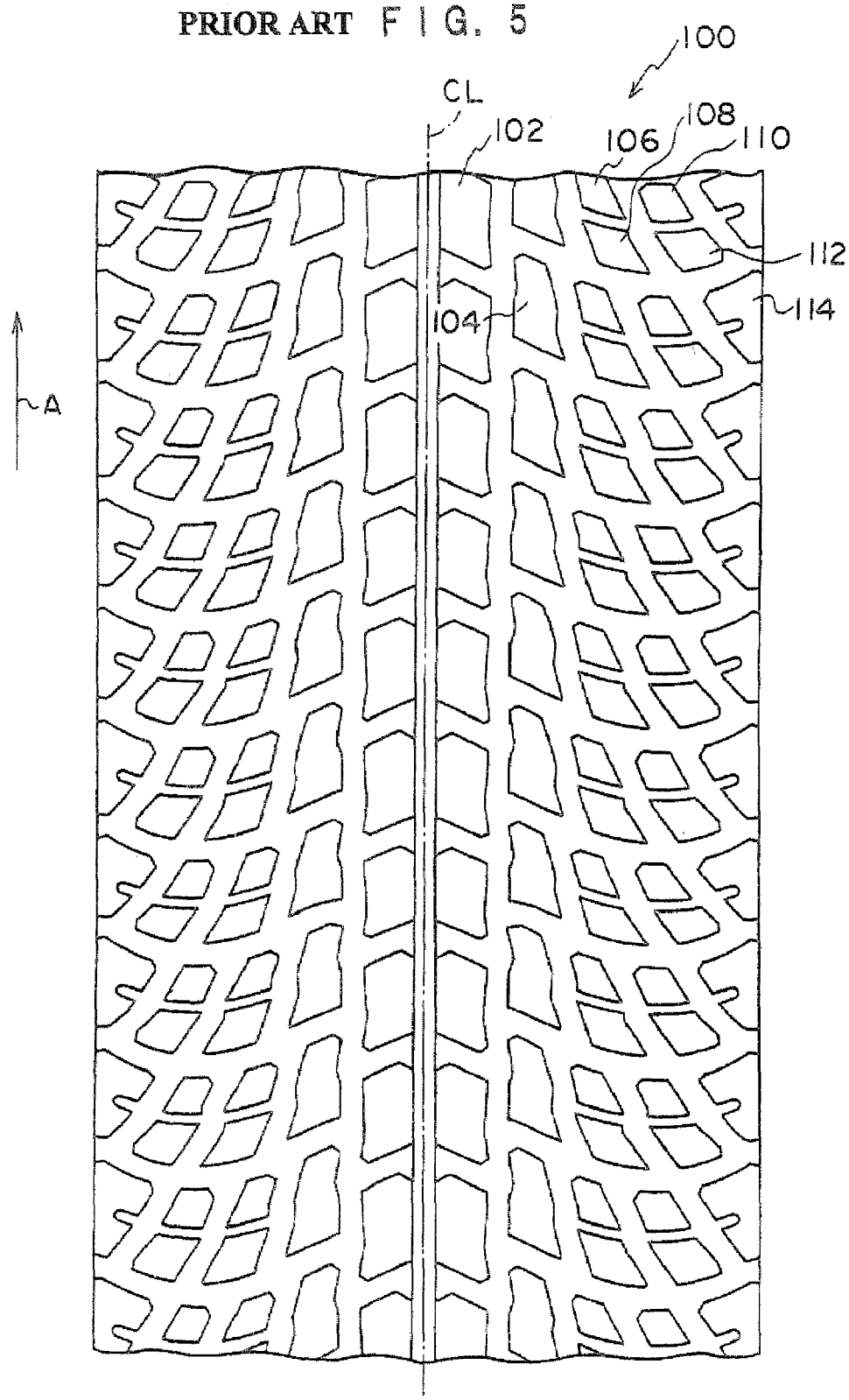
FIG. 5 is an evolved view of a tread of a pneumatic tire for a motorcycle according to a conventional example 1.

A tire in Comparative Example 1 is a pneumatic tire for a motorcycle having a pattern shown in FIG. 5.

Figure 8:
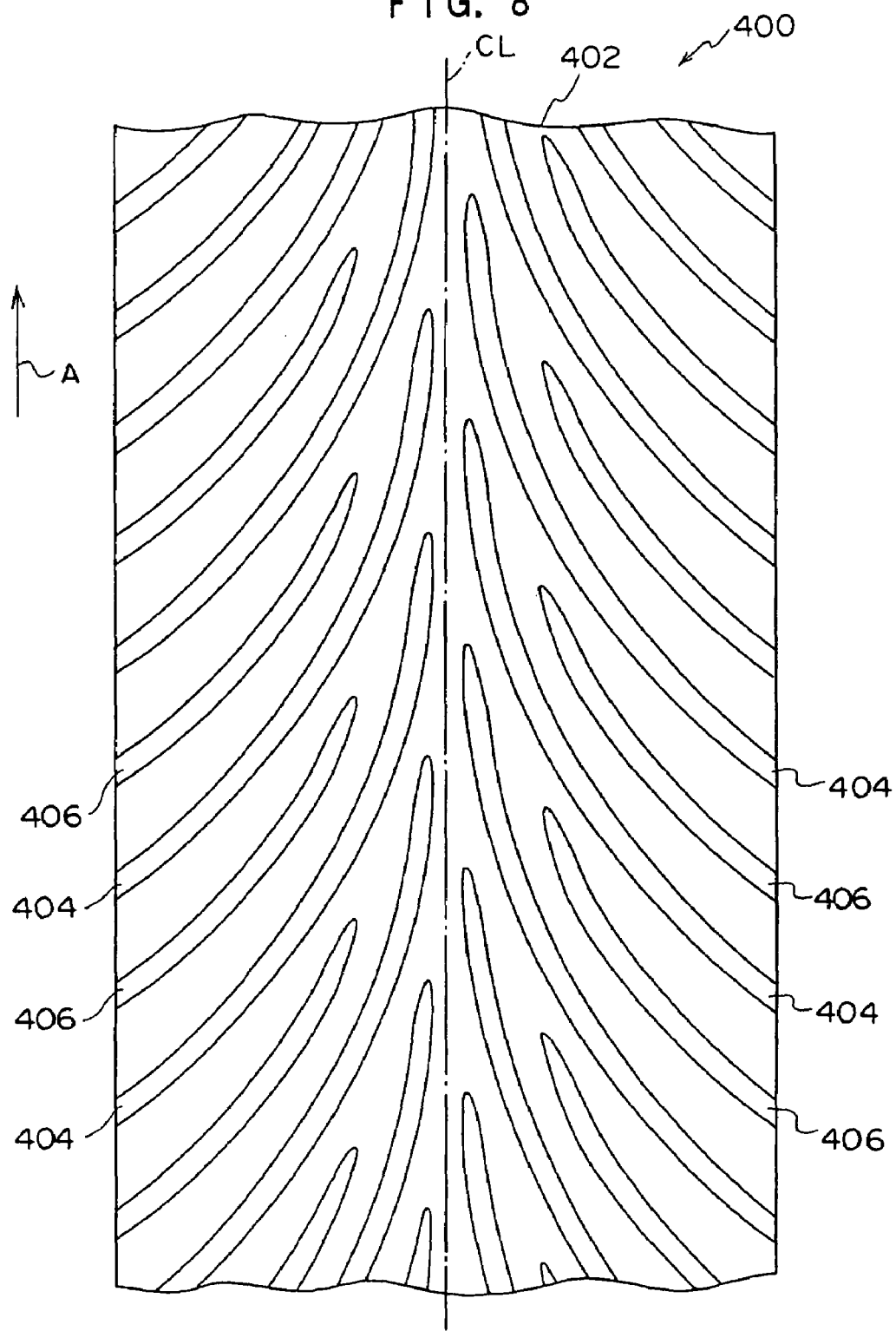
FIG. 8 is an evolved view of a tread of a pneumatic tire for a motorcycle according to a comparative example 1.

A tire in Comparative Example 1 is a pneumatic tire for a motorcycle having a pattern shown in FIG. 8. As shown in FIG. 8, in a tread 402 of a tire 400 in Comparative Example 1, a first inclining groove 404 which extends from a tread end to the tire equatorial plane CL and which terminates in the vicinity of the tire equatorial plane CL, and a second inclining groove 406 which is shorter than the first inclining groove 404 are alternately arranged in a tire circumferential direction. Further, the first and second inclining grooves 404 and 406 at one side have the respective phase differences to those at the other side, with the tire equatorial plane CL interposed therebetween.

Figure 9:
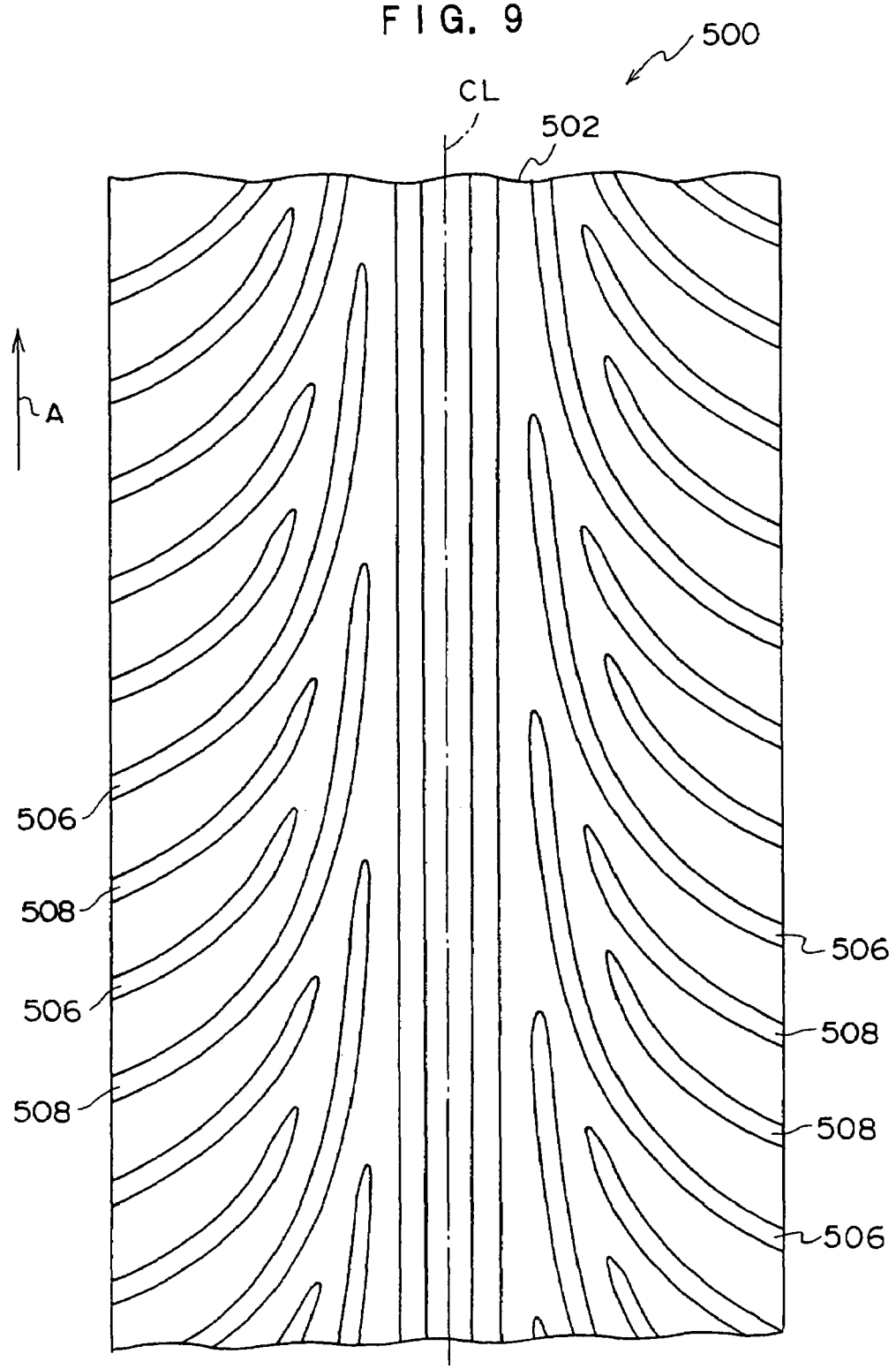
FIG. 9 is an evolved view of a tread of a pneumatic tire for a motorcycle according to a comparative example 2.

A tire in Comparative Example 2: a pneumatic tire for a motorcycle having a pattern shown in FIG. 9. As shown in FIG. 9, a tread 502 of a tire 500 of Comparative Example 2 has a pair of linear circumferential direction grooves 504 disposed at a central portion in a tire transverse direction, and the pair of the linear circumferential direction grooves 504 extends linearly along a tire circumferential direction. Further, a first inclining groove 506, which extends from a tread end to the tire equatorial plane CL and which terminates in the vicinity of the linear circumferential direction groove 504, is provided at an external side in a tire transverse direction of the linear circumferential direction groove 504, and two second inclining grooves 508, each of which is shorter than the first inclining groove 506, are interposed between the first inclining grooves 506 in a tire circumferential direction. Further, the first and second inclining grooves 506 and 508 at one side have the respective phase differences with respect to those at the other side, with the tire equatorial plane CL interposed therebetween.

Figure 6:
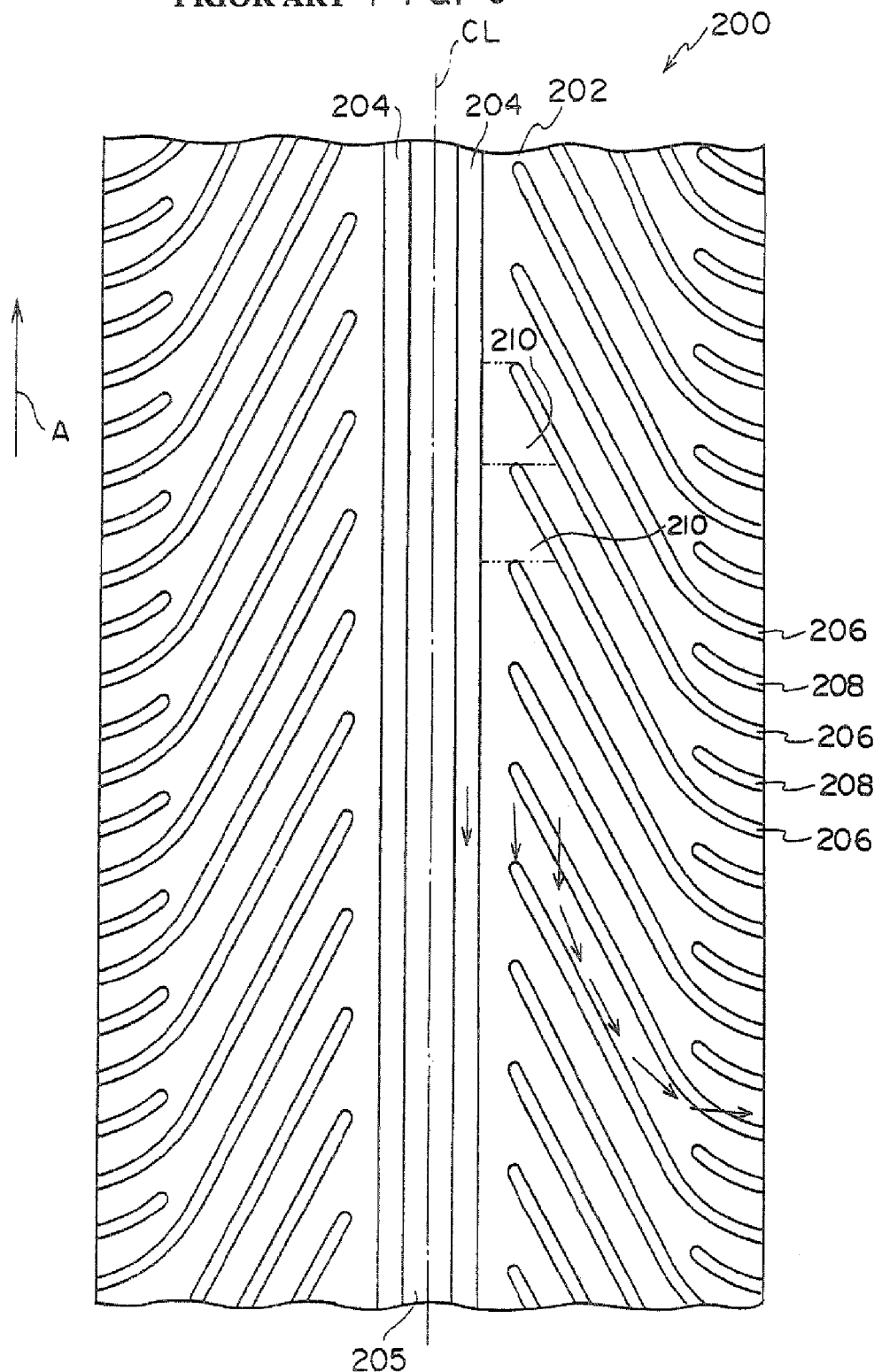
FIG. 6 is an evolved view of a tread of a pneumatic tire for a motorcycle according to a conventional example (conventional example 2 in a test example)
Figure 7:
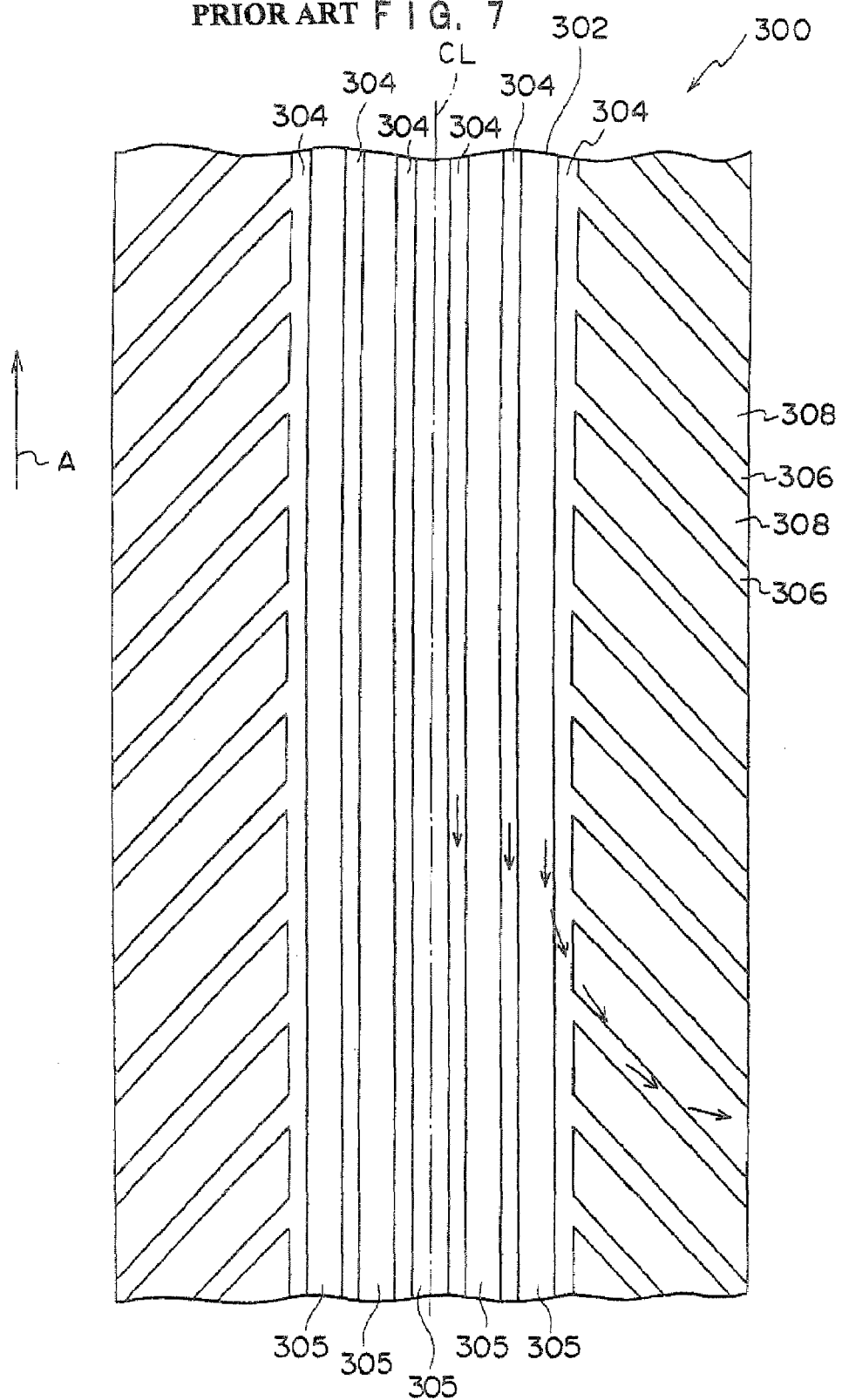
FIG. 7 is an evolved view of a tread of a pneumatic tire for a motorcycle according to a conventional example.

A tire in Conventional Example 2 is a pneumatic tire for a motorcycle having a pattern shown in FIG. 6.

Moreover, the respective portions of these test tires are compared with each other as described in table 1 shown below.

Next, a test method of a tire will be explained.

Test was carried out such that a 180/55ZR17 test tire was assembled to a rim having 17 inches (43.2 cm), filled with an internal pressure of 230 Kpa, and then attached to rear wheel of a real motorcycle.

A braking test, a cornering test, and a traction test were carried out on a panelar n-feeling test on a driving circuit.

A durability test was carried out on a long-un test (Race Lap Run) on a driving circuit, wherein Race Lap=30 (rounds), Race Distance=120 km.

In addition, evaluation results of the respective tests were as described in table 1 described below. Further, evaluation was explained as described in table 2.

TABLE 1

| | Example | Conventional Example | Comparative Example 1 | Comparative Example 2 | Comparative Example 3 |
|---|---|---|---|---|---|
| Inclining groove angle (degree) at the tread central region | 9 | None | 18 | 10 | 28 |
| Amplitude of circumferential direction groove/road-contact width (%) | 80 | X amplitude 0 wavelength ∞ | X no circumferential direction groove | X amplitude 0 wavelength ∞ | X amplitude 0 wavelength ∞ |
| ½ wavelength of circumferential direction groove/road-contact length (%) | 90 | | | | |
| Width, length and the like of the first longitudinal land portion and the second longitudinal land portion | ○ | X | X | X | X |
| Phase difference or the like of a pair of inclining grooves | ○ | X | X | X | X |
| Sub-inclining groove | ○ | X | ○ | ○ | ○ |
| Phase difference or the like of a pair of inclining grooves | ○ | X | X | X | X |
| Width of central continuous circumferential rib (%) | 27 | X | X | 29 | 29 |
| Angle of loose inclining groove | 110 | X | 125 | 115 | 110 |
| Minimum width of longitudinal land portion | ○ | X | ○ | ○ | ○ |
| Sharp inclining groove and loose inclining groove are smoothly connected | ○ | X | ○ | ○ | ○ |
| Difference between entire length of inclining groove forming first land portion and inclining groove forming second land portion (%) | 13 | X | ○ | ○ | ○ |
| Groove width compared with width of circumferential grooves (%) | 70 | X | X | 73 | X |
| Circumferential pitch length between grooves at tread end compared with road contact length of tire (%) | 30 | X | 25 | 24 | 11 |
| Width of end portion in tire rotational direction side of first and second longitudinal land portions compared with width of central circumferential rib (%) | 95 | X | X | 88 | 88 |
| Amplitude of zigzag circumferential direction groove (%) | 295 | X amplitude 0 wavelength ∞ | X no circumferential direction groove | X amplitude 0 wavelength ∞ | X amplitude 0 wavelength ∞ |
| TH/SW | 0.314 | 0.314 | 0.314 | 0.314 | 0.314 |
| Road-contact length/road-contact width (%) | 215 | 215 | 215 | 215 | 215 |
| Negative rate at the tread central region | 35 | 45 | 35 | 35 | 33 |
| Negative rate at the tread side region | 25 | 40 | 29 | 25 | 30 |
| Flatness at the tread central region | 0.64 | 0.64 | 0.64 | 0.64 | 0.64 |
| Flatness at the tread side region | 0.36 | 0.36 | 0.36 | 0.36 | 0.36 |
| Angle (degree) at the stamping side groove wall | 10 | 10 | 10 | 10 | 10 |
| Angle (degree) at the kick-out side groove wall | 20 | 20 | 20 | 20 | 20 |
| Groove depth | ○ | X | ○ | ○ | ○ |

TABLE 1-continued

|  | Example | Conventional Example | Comparative Example 1 | Comparative Example 2 | Comparative Example 3 |
|---|---|---|---|---|---|
| Evaluation of braking | ⓞⓞ | ○ | X | Δ | ⓞ |
| Evaluation of cornering | ⓞⓞ | ○ | Δ | X | ○ |
| Evaluation of traction | ⓞⓞ | ○ | ⓞⓞⓞ | X | ⓞⓞ |
| Evaluation of durability (confirmation by worn surface) | ⓞⓞ | X | not evaluated | not evaluated | not evaluated |

TABLE 2

| | |
|---|---|
| ⓞⓞⓞ | extremely good |
| ⓞⓞ | good |
| ⓞ | slightly good |
| ○ | ordinary |
| Δ | slightly bad |
| X | bad |

As the results of the table, in the pneumatic tire for a motorcycle of Example to which the present invention was adopted, it can be noted that all of the braking, cornering, and traction performances, and wear resistance could be achieved together at high levels.

Industrial Applicability

As described above, the pneumatic tire for a motorcycle according to the present invention can be suitably used for a motorcycle, and is particularly suitable, for example, when it is desired to achieve both wear resistance and wet steering stability.

What is claimed is:

1. A pneumatic tire for a motorcycle, comprising:
a tread which has a tread surface portion whose external surface curvature is comparatively large;
a pair of zigzag circumferential direction grooves for defining a central continuous circumferential rib which is positioned at a central portion in a tire axial direction of the tread and which extends in a zigzag shape continuously in a tire circumferential direction, which extend in a zigzag shape along the tire circumferential direction; and
a plurality of pairs of inclining grooves, the inclining grooves being provided in the tire circumferential direction so as to be separated from each other at an interval at both sides in a tire transverse direction of the pair of zigzag circumferential direction grooves and being inclined with respect to the tire transverse direction such that each inclining groove extends from a tread end toward a tire equatorial plane and terminates near the zigzag circumferential direction groove without contacting therewith, and an end portion of the inclining groove at a tire equatorial plane side is positioned further to a tire rotational direction side, than an end portion of the inclining groove at a tread end side, characterized in that
the inclining groove has a sharp inclining groove portion which is positioned at the tire equatorial plane side, and whose angle with respect to the tire circumferential direction is within a range of 0 to 20 degrees, and a loose inclining groove portion which is positioned at an external side in the tire transverse direction of the sharp inclining groove portion and whose angle with respect to a tire circumferential direction is set larger than the angle of the sharp inclining groove portion,
a first longitudinal land portion having a substantially uniform width and a second longitudinal land portion having a width which gradually increases in a direction opposite to the tire rotational direction are alternately connected to each other and arranged in the tire circumferential direction between sides forming a zigzag shape of the zigzag circumferential direction groove and the sharp inclining groove portions, due to that a main portion of the sharp inclining groove portion at the tire equatorial plane side is positioned so as to face the side forming a zigzag shape of the zigzag circumferential direction groove, and portions of one sharp inclining groove portion and another sharp inclining groove portion of the inclining grooves adjacent to each other in the tire circumferential direction are made to overlap one another in the tire transverse direction.

2. The pneumatic tire for a motorcycle according to claim 1, characterized in that a tread crown radius at a tire equatorial plane portion as seen from a cross section along a tire rotational axis is equal to or less than 250 mm.

3. The pneumatic tire for a motorcycle according to claim 1, characterized in that an amplitude of the zigzag shape of the zigzag circumferential direction groove is within a range of 50 to 100% of a road-contact width of a tire when the tire is attached to a standard rim, is filled with a standard air pressure, and receives a standard load in a state of a camber angle 0°, and a ½ wavelength of the zigzag shape of the zigzag circumferential direction groove is within a range of 50 to 150% of a road-contact length of the tire when the tire is attached to the standard rim, is filled with the standard air pressure, and receives the standard load in the state of the camber angle 0 °.

4. The pneumatic tire for a motorcycle according to claim 1, characterized in that
the sharp inclining groove portion forming the first longitudinal land portion inclines in the same direction as the side of the zigzag circumferential direction groove that faces the sharp inclining groove portion,
the sharp inclining groove portion forming the second longitudinal land portion inclines in an inverse direction to the side of the zigzag circumferential direction groove that faces the sharp inclining groove portion, and
a length in a tire circumferential direction of the second longitudinal land portion is shorter than that of the first longitudinal land portion.

5. The pneumatic tire for a motorcycle according to claim 1, characterized in that end portions at a tire equatorial plane side of one inclining groove and the other inclining groove of the pair of the inclining grooves are positioned so as to have a phase difference in the tire circumferential direction with the tire equatorial plane interposed therebetween, and a phase difference of one pair of the inclining grooves and a phase difference of another pair of the inclining grooves adjacent to each other in the tire circumferential direction are set in directions opposite to each other.

6. The pneumatic tire for a motorcycle according to claim 1, characterized in that one auxiliary inclining groove or two, which are extended from the tread end to the tire equatorial plane side to terminate near a boundary between the tread central region and the tread side region, and which are substantially in parallel to the inclining grooves adjacent to each other in the tire circumferential direction, are provided between the inclining grooves in the tire circumferential direction.

7. The pneumatic tire for a motorcycle according to claim 6, characterized in that the auxiliary inclining grooves are positioned between the inclining grooves in the tire circumferential direction such that a groove distance between the grooves in the tire circumferential direction is kept constant.

8. The pneumatic tire for a motorcycle according to claim 1, characterized in that a width of the central continuous circumferential rib is within a range of 20 to 50% of a road-contact width of a tire when the tire is attached to a standard rim, is filled with a standard air pressure, and receives a standard load in a state of a camber angle 0°.

9. The pneumatic tire for a motorcycle according to claim 1, characterized in that an angle of the loose inclining groove portion to be measured from the tire rotational direction side to an external side in the tire axial direction with respect to the tire circumferential direction is within a range of 90 to 150 degrees.

10. The pneumatic tire for a motorcycle according to claim 1, characterized in that minimum widths of the respective land portions defined by grooves are substantially the same.

11. The pneumatic tire for a motorcycle according to claim 1, characterized in that the sharp inclining groove portion and the loose inclining groove portion are smoothly connected to each other.

12. The pneumatic tire for a motorcycle according to claim 1, characterized in that the entire length of the inclining groove forming the first longitudinal land portion is longer, by 5 to 20%, than that of the inclining groove forming the second longitudinal land portion.

13. The pneumatic tire for a motorcycle according to claim 1, characterized in that characterized in that grooves except for the zigzag circumferential direction grooves have substantially the same width which is within a range of 60 to 80% of a groove Width of the zigzag circumferential direction groove.

14. The pneumatic tire for a motorcycle according to claim 1, characterized in that a circumferential direction pitch length between grooves at the tread end is within a range of 20 to 50% of a road-contact length of a tire when the tire is attached to a standard rim, is filled with a standard air pressure, and receives a standard load in a state of a camber angle 0°.

15. The pneumatic tire for a motorcycle according to claim 1, characterized in that a width of an end portion in the tire rotational direction side of the first longitudinal land portion and that of the second longitudinal land portion are within a range of 50 to 120% of a width of the central continuous circumferential rib.

16. The pneumatic tire for a motorcycle according to claim 1, characterized in that an amplitude of the zigzag shape of the zigzag circumferential direction groove is within a range of 30 to 150% of a width of the central continuous circumferential rib.

17. The pneumatic tire for a motorcycle according to claim 1, characterized in that TH/SW is within a range of 0.25 to 0.45, given that a drop height measured in a tire radial direction between a tread maximum radial portion to a tire maximum width portion is TH, and a tire maximum width is SW, a road-contact length of a tire is within a range of 200 to 250% of a road-contact width when the tire is attached to a standard rim, is filled with a standard air pressure, and receives a standard load in a state of a camber angle 0°, and a road-contact shape is formed into a substantially ellipse configuration whose long axis is oriented in a tire circumferential direction.

18. The pneumatic tire for a motorcycle according to claim 1, characterized in that a negative rate is within a range of 30 to 40% in a region within a range 50% of a tread periphery width with the tire equatorial plane of the tread as a center, and a negative rate is within a range of 20 to 30% in a region at an external side in the tire transverse direction, with respect to the region within a range of 50% of the tread periphery width with the tire equatorial plane of the tread as a center.

19. The pneumatic tire for a motorcycle according to claim 1, characterized in that an outer contour flatness in the tread central region is within a range of 0.4 to 0.7, and that in each of the tread side regions is within a range of 0.2 to 0.7, given that a tread crown radius/a tire maximum width is the outer contour flatness in the tread region within a range of 30 to 50% of a tread periphery width with a tire equatorial plane as a center is a tread central region, and regions at an external side in the tire transverse direction of the tread central region are respectively tread side regions.

20. The pneumatic tire for a motorcycle according to claim 1, characterized in that an angle of a groove wall at a groove stamping side of the inclining groove with respect to a normal line stood vertically on a tread surface is within a range of 0 to 45°, and an angle of a groove wall at a groove kick-out side thereof with respect to the normal line stood vertically on the road surface is within a range of 0 to 45°, and the angle of the groove wall at the groove stamping side is smaller than that at the groove kick-out side.

21. The pneumatic tire for a motorcycle according to claim 1, characterized in that the respective groove depths are substantially the same in a region within a range of 50% of a tread periphery width with a tire equatorial plane of the tread as a center.

22. The pneumatic tire for a motorcycle according to claim 1, characterized in that the tire has a radial structure.

23. The pneumatic tire for a motorcycle according to claim 1, wherein the main portion of the one sharp inclining groove portion is positioned so as to face a first side forming a zigzag shape of the zigzag circumferential direction groove, and the main portion of the other sharp inclining groove portion is positioned so as to face a second side forming a zigzag shape of the zigzag circumferential direction groove, the first side and the second side are connected in substantially the tire circumferential direction, and inclining angles of the first side and the second side are different.

* * * * *